US007903629B2

(12) United States Patent
Walker et al.

(10) Patent No.: US 7,903,629 B2

(45) Date of Patent: Mar. 8, 2011

(54) HIERARCHICALLY MODULATED OFDM COMMUNICATION FROM A SATELLITE-BASED TRANSMITTER WITH REDUCED SECONDARY DATA LOSS FROM CLIPPING

(75) Inventors: Glenn A. Walker, Greentown, MI (US); Jeffrey J. Marrah, Kokomo, IN (US); Eric A. Dibiaso, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 223 days.

(21) Appl. No.: 12/362,712

(22) Filed: Jan. 30, 2009

(65) Prior Publication Data

US 2010/0195482 A1 Aug. 5, 2010

(51) Int. Cl.
*H04B 7/208* (2006.01)

(52) U.S. Cl. .......................... 370/344; 370/319; 370/480

(58) Field of Classification Search ................. 370/208, 370/319, 344, 480, 529

See application file for complete search history.

(56) References Cited

U.S. PATENT DOCUMENTS

| | | | | |
|---|---|---|---|---|
| 3,973,201 | A | 8/1976 | Andren | |
| 4,238,849 | A | 12/1980 | Gassmann | |
| 5,646,935 | A | 7/1997 | Ishikawa et al. | |
| 5,687,166 | A | 11/1997 | Natali et al. | |
| 6,195,534 | B1 * | 2/2001 | Sakoda et al. | 455/45 |
| 6,996,418 | B2 | 2/2006 | Teo et al. | |
| 7,215,713 | B2 | 5/2007 | Walker et al. | |
| 2002/0150038 | A1 * | 10/2002 | Sumasu et al. | 370/208 |
| 2008/0123752 | A1 * | 5/2008 | Chen | 375/240.26 |

* cited by examiner

*Primary Examiner* — Ricky Ngo

*Assistant Examiner* — Wei-Po Kao

(74) *Attorney, Agent, or Firm* — Jimmy L. Funke

(57) ABSTRACT

High priority data and low priority digital data are transmitted as primary and secondary data in hierarchically modulated, orthogonal frequency division multiplexing (OFDM) from an earth-orbiting satellite. To enable the transmitter amplifier to be operated with less back-off from saturation without clipping, the low priority OFDM symbols have fewer samples than the high priority OFDM symbols, and the high priority samples on which the low priority samples are superimposed are selected according to a first deterministic rule using sample power comparisons of the high priority samples to concentrate the low priority samples on those high priority samples having lower (optimally, the lowest) sample power. The low priority samples are distributed on the selected high priority samples according to a second deterministic rule relating the original low priority sample order to the original high priority sample order.

12 Claims, 21 Drawing Sheets

HIERARCHICALLY MODULATED OFDM COMMUNICATION FROM A SATELLITE-BASED TRANSMITTER WITH REDUCED SECONDARY DATA LOSS FROM CLIPPING

TECHNICAL FIELD

The technical field of this invention is orthogonal frequency division multiplex (OFDM) communication from an earth-orbiting satellite to a terrestrial receiver.

BACKGROUND OF THE INVENTION

Although OFDM communication is known and used in earth-based communication systems using higher order (hierarchical) modulation, it presents a problem for transmission of such hierarchically modulated signals from an earth-orbiting satellite to an earth based receiver. The OFDM modulation scheme has a high peak-to-average power ratio, due to the number of active carriers that are transmitted simultaneously. For power amplifiers, it is highly desirable to run the output at or near saturation, since this typically maximizes the power added efficiency: RF output power/DC power. However, running at saturation poses a problem for OFDM systems, because the higher peaks tend to clip; and any clipping in time causes a distortion over all the active carriers. Thus, typically, a terrestrial system will use a 6 dB back-off from saturation to allow only strong peaks to get clipped. But this reduces broadcast signal strength, and thus coverage area. To improve coverage area in land-based systems, more repeaters are used.

The solution of more repeaters is not very practical for satellite-based transmitters, since the cost of a satellite is very high, and having the maximum RF output power is thus desired. There have been proposals to operate satellite-based OFDM transmitters with a 3 dB back-off from saturation, but this smaller back-off causes significantly more distortion than the traditional 6 dB back-off. To compensate for this smaller back-off, a more powerful forward error correcting (FEC) code (Turbo or LDPC) can be used. This works well for traditional signals but poses a problem for hierarchical modulation of the type wherein a primary (high priority) signal is modulated by a secondary (low priority) signal of lower power and the resulting modulated signal itself modulates the carrier(s). Such hierarchical modulation allows for various levels of performance in the overall system. However, when the power amplifier is backed off too much from saturation, the higher power (primary) signal is clipped; and this causes distortion equally on both the high power primary signal and the lower power secondary signal. This clipping appears as additional noise that can render the secondary signal unrecoverable by a receiver.

It is known in the prior art that one may decrease the data transmission rate of the secondary data modulated onto the primary data in hierarchical modulation by providing known instances where the secondary modulation signal has no energy, but this process of the prior art does not optimally address the problem of clipping in hierarchically modulated OFDM communications when operating the transmitter power amplifier close to saturation. Clipping of a hierarchically modulated OFDM sample creates noise that is spread across all the OFDM carriers and can completely obscure the low priority (secondary) data in the symbol. An optimal solution concentrates on reducing the clipping rather than reducing the low priority data rate relative to the high priority data rate.

SUMMARY OF THE INVENTION

The invention provides increased resistance to clipping and resulting loss of secondary data in hierarchically modulated OFDM communications from a transmitter having a power amplifier operating close to saturation, which is desirable for a transmitter on an earth-orbiting satellite communicating with earth-based receivers. The invention is based in a recognition that, in a hierarchically modulated OFDM transmission in which the secondary data is provided in low priority symbols having a smaller number of samples than the high priority samples of the primary data, an additional reduction in clipping can be achieved by directing the low priority samples away from the highest powered high priority samples in corresponding symbols and superimposing them on the lower powered high priority samples. Thus, the highest powered high priority samples will not be made more likely to clip with the additional power of a low priority sample. Instead, the lowest powered high priority samples, which are the least likely to clip, receive the increases in sample power from the superimposed low priority samples. The invention provides, in some of its embodiments, an optimal distribution of low priority samples onto high priority samples for a given secondary data rate.

In one aspect of the invention, high priority data and low priority digital data are transmitted in hierarchical modulation from an earth-orbiting satellite. The high priority digital data are encoded with a forward error correcting code to provide encoded high priority digital data, and an Inverse Fast Fourier Transform is performed on the encoded high priority digital data to provide high priority, orthogonal frequency division multiplexed (OFDM) symbols each comprising a first predetermined number of samples in an original high priority sample order. In addition, the low priority digital data are encoded with a forward error correcting code to provide encoded low priority digital data; and an Inverse Fast Fourier Transform is performed on the encoded low priority digital data to provide low priority orthogonal frequency division multiplexed (OFDM) symbols each comprising a second predetermined number of samples in an original low priority sample order, wherein the second predetermined number is less than the first predetermined number.

For a selected one of the high priority OFDM symbols and a selected one of the low priority OFDM symbols:

(A) a plurality of samples of the selected high priority OFDM symbol equal in number to the second predetermined number are selected, wherein the selecting is in accordance with a first consistent, deterministic rule using sample power comparisons to eliminate one or more of the highest powered samples of the high priority OFDM symbol from selection;

(B) each sample of the selected low priority OFDM symbol is associated with a different one of the selected samples of the selected high priority OFDM symbol according to a second consistent, deterministic rule relating the original low priority sample order to the original high priority sample order; and (C) a combined OFDM symbol is derived based on the selected high priority OFDM symbol by (1) leaving unchanged each sample of the selected high priority OFDM symbol having no associated sample of the low priority OFDM symbol and (2) superimposing each sample of the selected low priority OFDM symbol onto its associated sample of the selected high priority OFDM symbol to provide a combined sample having a sample power equal to the sum of the sample powers of the associated samples so combined.

The combined OFDM symbol is incorporated in a radio frequency OFDM signal, whereby the encoded low priority digital data is modulated as secondary data on the encoded high priority digital data, as primary data, in hierarchical modulation; and The radio frequency OFDM signal is transmitted on a plurality of orthogonal radio frequency carriers.

In another aspect of the invention, a received transmission comprises the hierarchically modulated orthogonal frequency division multiplexed (OFDM) radio frequency transmission provided according to the first aspect of the invention described above and comprises a series of combined OFDM symbols comprising encoded low priority digital data hierarchically modulated onto encoded high priority digital data.

The combined OFDM symbols are derived from the received, hierarchically modulated OFDM transmission and copied; and the copies are stored. The combined OFDM symbols are demodulated to recover the high priority OFDM symbols therein; and the high priority symbols are decoded to recover the high priority digital data.

The high priority digital data are copied and re-encoded; and an Inverse Fast Fourier Transform is performed on the encoded high priority digital data to produce reconstructed high priority OFDM symbols corresponding to the combined OFDM symbols. One of the high priority OFDM symbols and the stored copy of its corresponding combined OFDM symbol are selected. Each sample of the selected high priority OFDM symbol is subtracted from the corresponding sample of the stored copy of the combined symbol to provide a Diff sample, with the provided Diff samples comprising a Diff symbol.

The samples of the reconstructed high priority OFDM symbol associated with samples of a low priority OFDM symbol are determined according to the first consistent, deterministic rule; and the Diff samples corresponding to the determined samples of the reconstructed high priority OFDM symbol are selected and distributed into the original low priority sample order according to the second consistent deterministic rule to provide a recovered low priority OFDM symbol. The recovered low priority OFDM symbol is demodulated and decoded to obtain the transmitted low priority digital data.

In either of the transmitting and receiving aspects of the invention, the first consistent, deterministic rule may comprise identifying a plurality of samples of the high priority OFDM symbol, equal in number to the number of samples of the low priority OFDM symbol, that are lowest in sample power.

In either of the transmitting and receiving aspects of the invention, the second consistent, deterministic rule may comprise associating each sample of the low priority OFDM symbol, in the original low priority sample order, with one of the selected samples of the high priority OFDM symbol, in order of increasing sample power.

In either of the transmitting and receiving aspects of the invention, the second consistent, deterministic rule may alternatively comprise associating each sample of the low priority OFDM symbol, in the original low priority sample order, with one of the selected samples of the high priority OFDM symbol, in the original high priority sample order.

In either of the transmitting and receiving aspects of the invention, the first and second consistent, deterministic rules together may comprise comparing samples of the selected high priority OFDM symbol, in the original high priority sample order, with a predetermined reference power limit and associating therewith a sample of the low priority OFDM symbol, in the original low priority sample order, only if the compared sample of the high priority OFDM symbol is no greater than the predetermined reference power limit.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
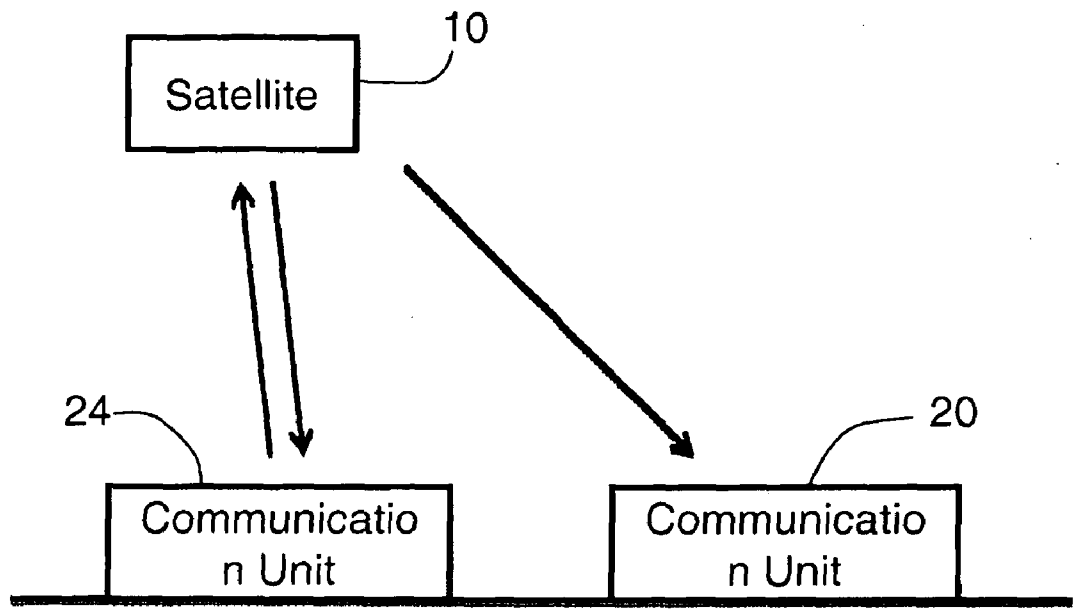
FIG. 1 is a block diagram of a satellite/earth communication system.
Figure 2:
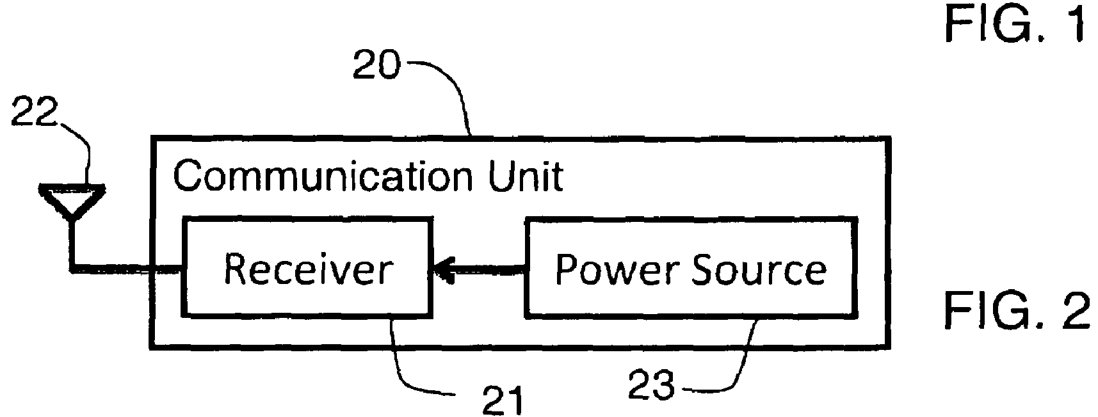
FIG. 2 is a block diagram of an earth-based communication unit for use in the communication system of FIG. 1.
Figure 3:
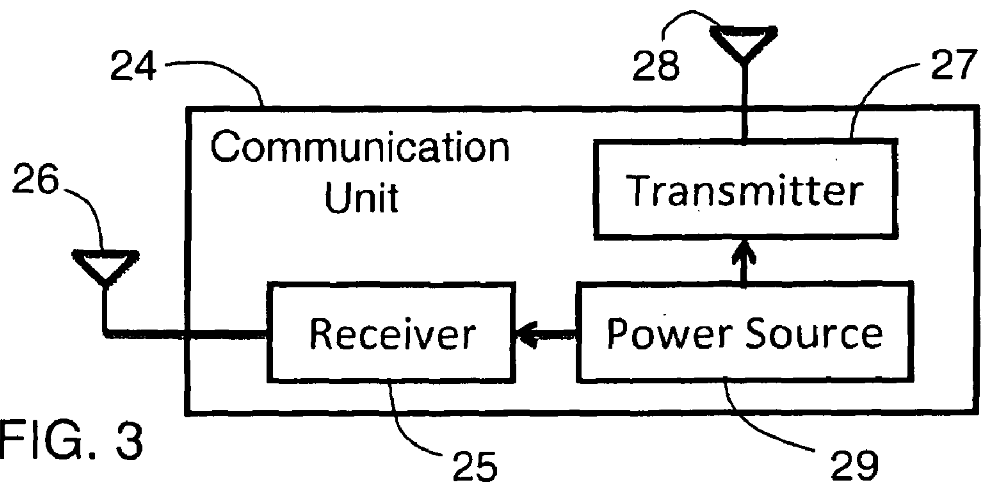
FIG. 3 is a block diagram of another earth-based communication unit for use in the communication system of FIG. 1.
Figure 4:
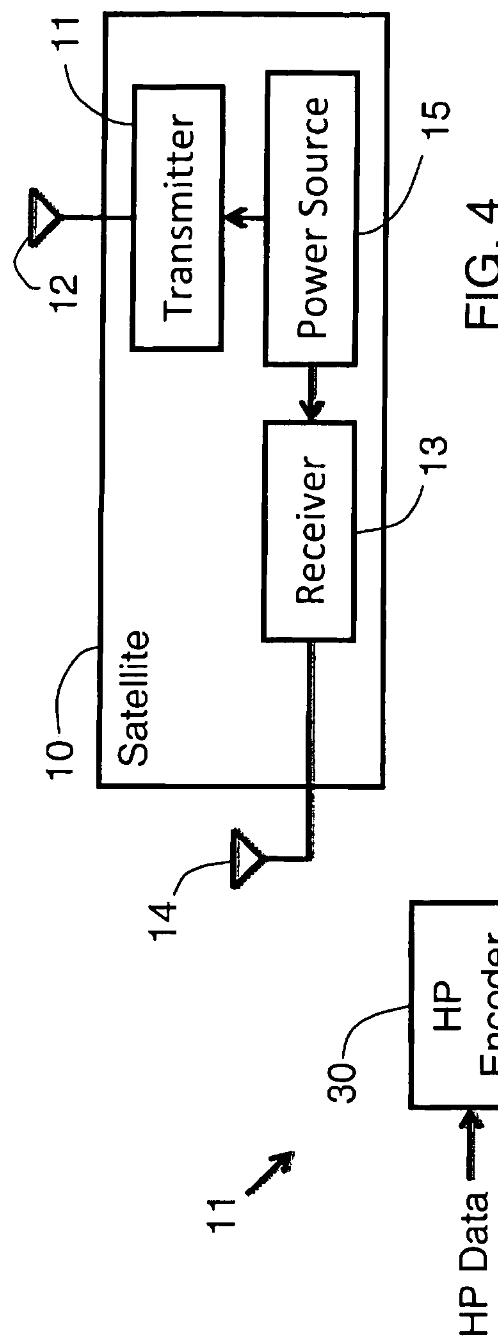
FIG. 4 is a block diagram of a satellite-based communication unit for use in the communication system of FIG. 1.

An embodiment of a transmission system utilizing the method of this invention is shown in FIG. 1. A satellite 10 in orbit around the earth is equipped for radio frequency communication with communication units on the earth. As shown in FIG. 4, satellite 10 includes at least one transmitter 11 with an antenna 12, at least one receiver 13 with an antenna 14, and an electric power source 15 providing electric power to transmitter 11 and receiver 13. As shown in FIG. 2, communication unit 20 includes at least one receiver 21 with an antenna 22 and powered by an electric power source 23. Communication unit 20 has no transmitting capability to satellite 10. As shown in FIG. 3, communication unit 24 includes at least one receiver 25 with an antenna 26 and at least at least one transmitter 27 with an antenna 28. Receiver 25 and transmitter 27 are both powered by an electric power source 29. Communication unit 24 may be, for example, a terrestrial repeater and/or a communication unit having two-way communication with satellite 10.

Figure 5:
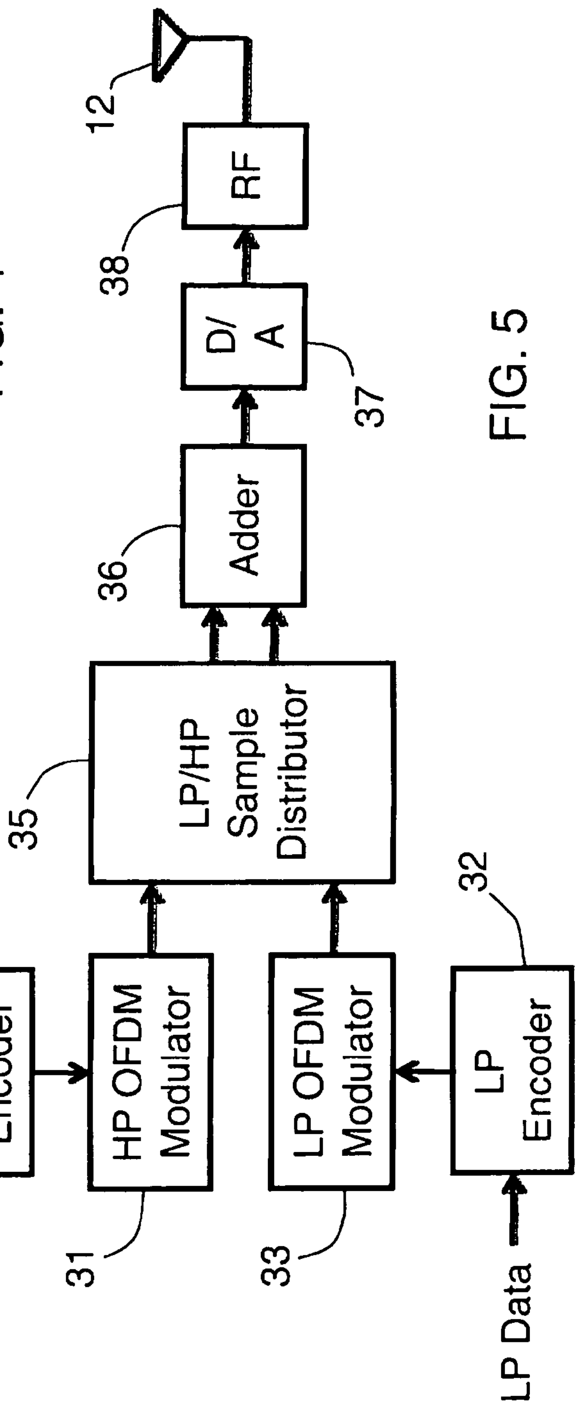
FIG. 5 is a block diagram of a transmitter for use in the satellite-based communication unit of FIG. 4

Transmitter 11 of FIG. 4 is shown in more detail in the block diagram of FIG. 5. High priority (HP) digital data, which may include—but is not limited to—audio and/or video program data, is encoded in HP Encoder 30 with at least a forward error-correcting (FEC) code, preferably turbo code, LDPC, or the equivalent, to produce encoded HP digital data. Turbo encoding, for example, may produce an output digital data stream having a 3:1 ratio of output words to input words. For example, each successive 12,282 turbo input words (two bits each) of HP digital data input to HP Encoder 30 may produce 36,846 turbo output words (two bits each) of encoded HP digital data. The encoded HP digital data is then processed with an Inverse Fast-Fourier Transform (IFFT) in HP OFDM Modulator 31 to produce samples of high priority (HP) OFDM digital data, with each such sample comprising, for example, 16 digital bits. A plurality of such samples equal to the number of carrier frequencies in the OFDM transmission—for example, 1,024 samples—comprises a symbol of the HP OFDM digital data.

A low priority (LP) digital data stream is likewise provided to a low priority (LP) encoder 32. The LP digital data is similarly encoded using a Forward Error Correcting code (turbo code, LPDC or the equivalent). The encoded LP digital data from LP encoder 32, which may also be in turbo words of 2 bits each, is input to a low priority (LP) OFDM modulator, wherein an Inverse Fast-Fourier Transform (IFFT) is applied to produce output samples of low priority (LP) OFDM digital data. It should be noted that the HP OFDM digital data and LP OFDM digital data each include any synchronization and other "overhead" bits required for data organization and handling, in addition to the content data that is to be transmitted. The LP OFDM digital data is constrained in two ways relative to the HP OFDM digital data. First, the number of bits per sample is preferably smaller for the LP OFDM digital data (for example, 15 bits vs. 16 bits per sample); and second, the IFFT is configured in symbols for fewer carriers for the LP OFDM digital data (for example, 512 carriers vs. 1024 carriers for the HP OFDM digital data). The reasons for these constraints will become apparent later in this description.

Figure 8:
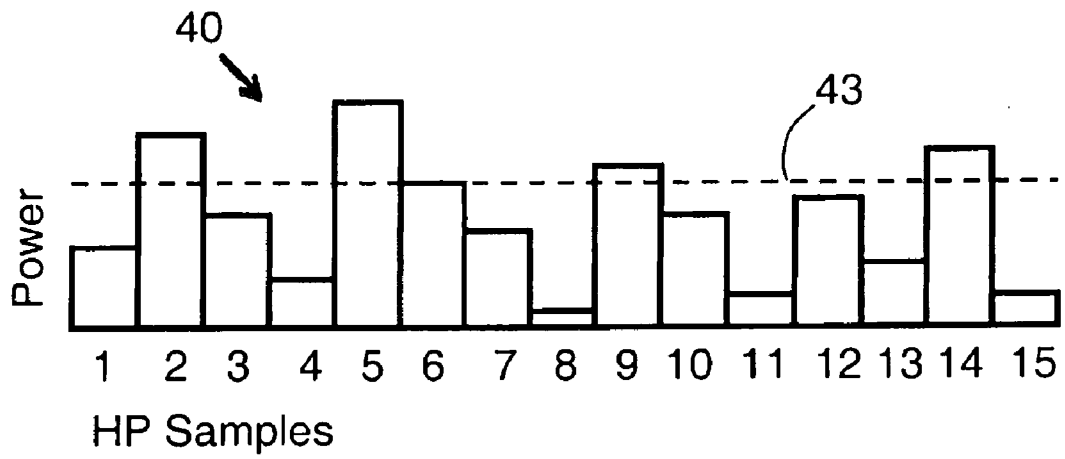
FIGS. 8, 9 and 10 are graphical representations of sample power useful in explaining the operation of the LP/HP sample distributer of FIG. 6.
Figure 9:
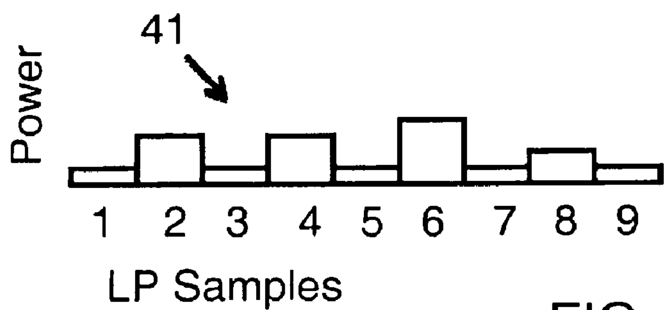

Symbols of HP and LP OFDM samples are shown graphically in FIGS. 8 and 9, respectively. The number of samples in each symbol has been reduced to fit in the drawing: from 1,024 and 512 samples, respectively, in a practical embodiment to fifteen and nine samples, respectively, in the described example. Referring to FIG. 8, an HP OFDM digital data symbol (HP OFDM symbol) 40 is shown, with the peak power of each sample represented by its relative height. The samples are numbered from 1 to 15 as they are output by HP OFDM modulator 31; and this will be referred to as their "original HP sample order." HP OFDM sample number 5—the highest powered sample shown—represents (in this example) the highest possible powered HP OFDM sample. FIG. 9 similarly shows an LP OFDM digital data symbol (LP OFDM symbol) 41 with its nine low priority (LP) samples each showing its peak power, indicated by its relative height, and numbered from 1 to 9 as they are output by LP OFDM modulator 33 in their "original LP sample order." The height of the samples in HP and LP OFDM symbols 40 and 41 are drawn to the same scale; and LP OFDM sample number 6—the highest powered sample shown—represents (in this example) the highest possible powered LP OFDM sample, which is substantially lower in power than the largest HP OFDM sample in HP OFDM symbol 40.

Returning to FIG. 5, the samples of HP and LP OFDM symbols 40 and 41 are provided to separate inputs of an LP/HP sample distributor 35, in which the nine samples of the LP OFDM symbol 41 are associated with nine different selected ones of the fifteen samples of the HP OFDM symbol 40. It should be stated that the words "associated" and "distributed" are used somewhat synonymously in this description, the difference being only that "associated" is used when referring to pairing a single HP sample and a single LP sample, whereas "distributed" is used when referring to performing such one-to-one pairing for a plurality of HP samples and a plurality of LP samples. The fifteen samples of HP OFDM symbol 40 are then provided from LP/HP sample distributor 35 to one input of adder 36 in sequence, and each LP sample now associated with an HP sample is provided to the other input to adder 36 at the same time as its associated HP sample so that the associated pair of HP and LP samples can be added in adder 36 to form a combined sample. Those HP samples not associated with LP samples pass through adder 36 without having anything added to them (other than zero, which is the equivalent). The resulting fifteen samples output from adder 36 form a hierarchically modulated OFDM symbol 42 consisting of nine combined samples, each replacing an associated pair of the HP and LP samples, and six HP samples that are unchanged, in the original HP sample order of the HP portion of each sample.

Figure 10:
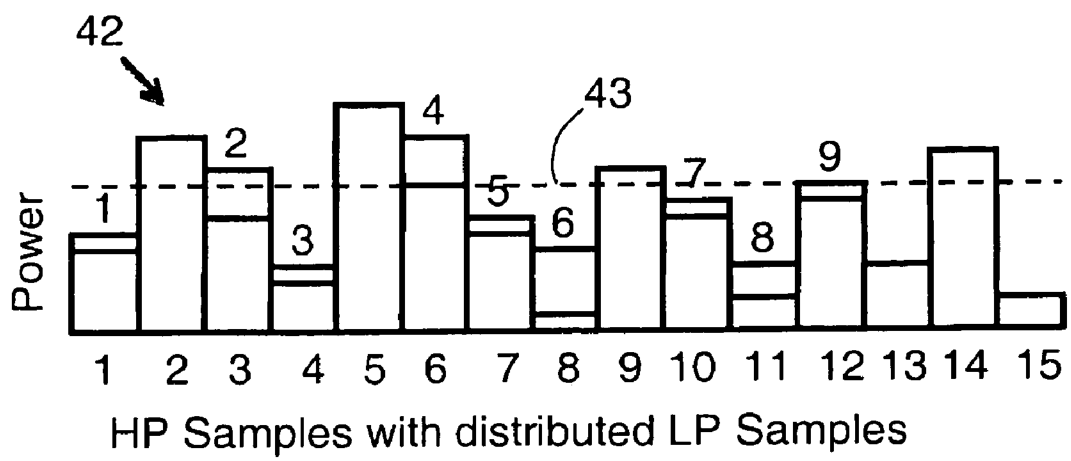

Hierarchically modulated OFDM symbol 42 is shown in graphical representation in FIG. 10. Each of the fifteen samples of the symbol is numbered below it with the preserved original HP sample order number of its HP portion, in original HP order. Each of the nine combined samples (numbers 1, 3, 4, 6, 7, 8, 10, 11, 12) comprises 2 vertically stacked boxes, with the lower box representing the HP sample and the upper box representing the associated LP sample, which has its original LP order number appearing above it. Those HP samples (numbers 2, 5, 9, 13, 14, 15) having no associated LP sample are easily recognizable by their lack of upper numbers.

Returning to FIG. 5, consecutive hierarchically modulated OFDM symbols (e.g. symbol 42 of FIG. 10) output by adder 36 comprise a hierarchically modulated OFDM signal that is prepared for broadcast on antenna 12 in the usual manner in D/A converter 37 and RF modulator 38. In the example described above, this OFDM broadcast would comprise fifteen orthogonal frequencies. In a real world example, the HP OFDM symbol size and the corresponding number of orthogonal frequencies would be much larger, such as the 1,024 previously mentioned.

Figure 6:
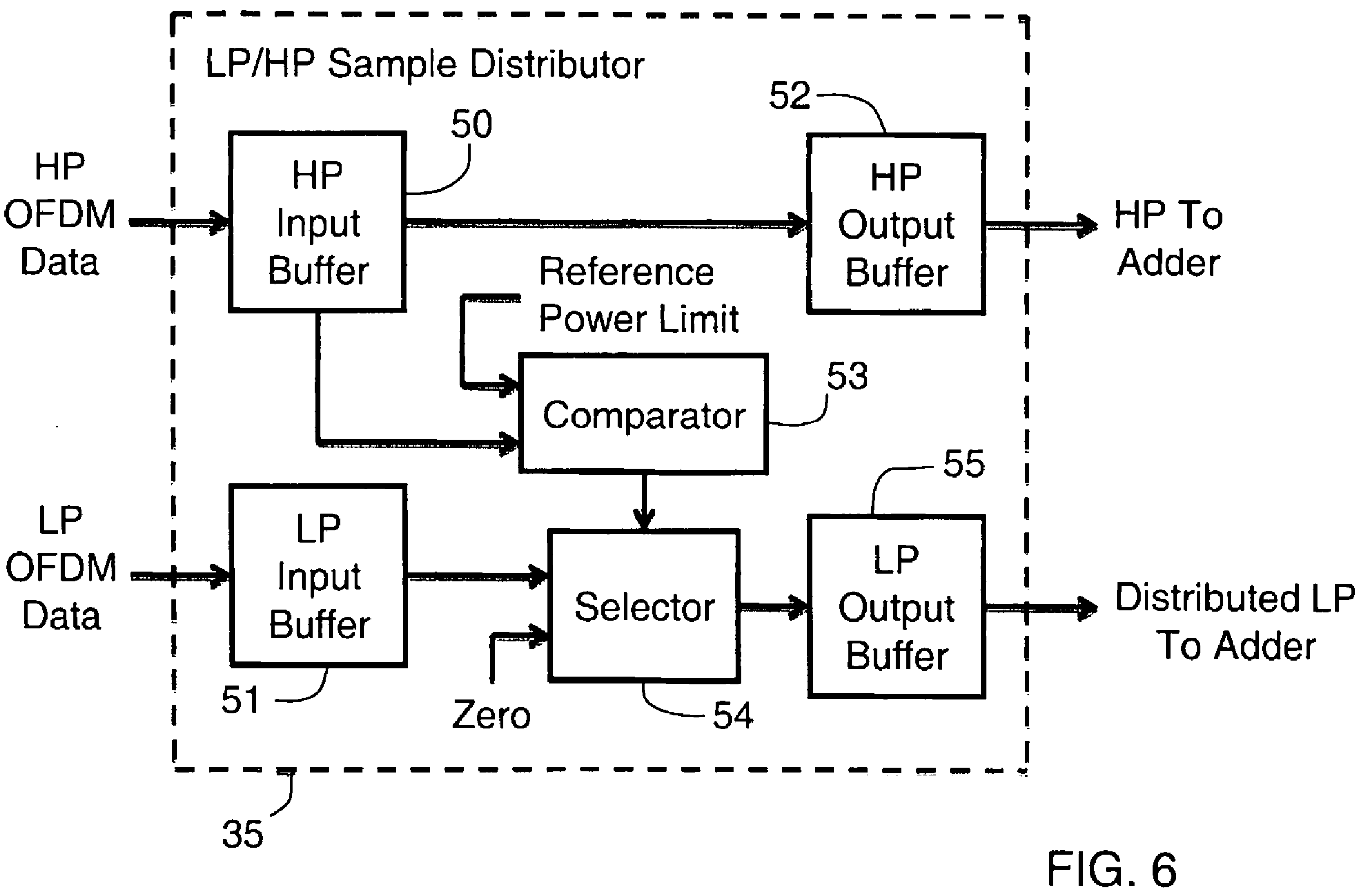
FIG. 6 is a block diagram of an embodiment of an LP/HP sample distributor, in accordance with this invention, for use in the satellite-based transmitter of FIG. 5.
Figure 7:
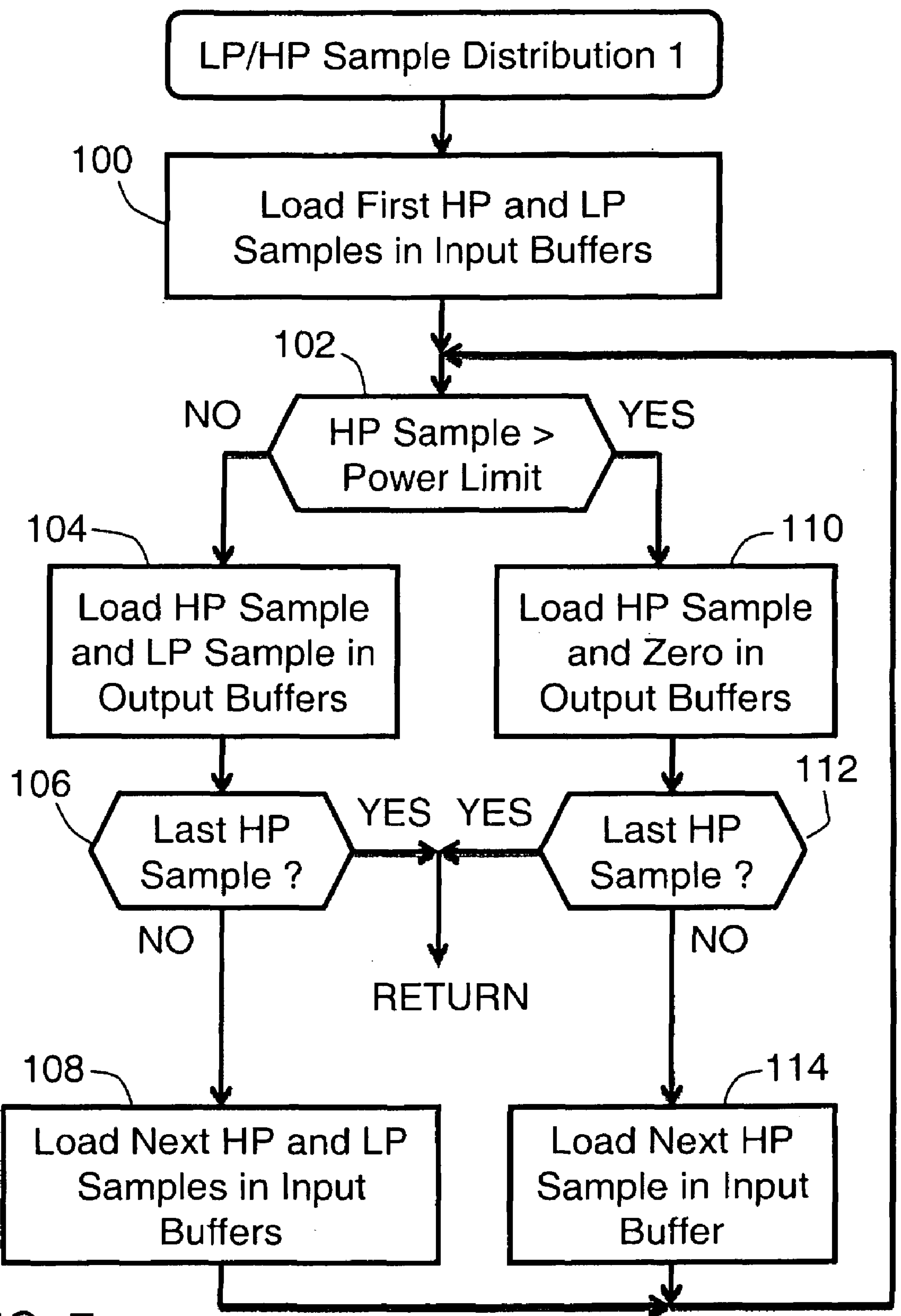
FIG. 7 is a flow chart illustrating the operation of the LP/HP sample distributor of FIG. 6.

A first embodiment of LP/HP sample Distributor 35 is described with reference to the block diagram of FIG. 6 and the flow chart of FIG. 7. The block diagram of FIG. 6 may represent a custom digital processor, in which case the flow chart of FIG. 7 is a process flow chart for the processor; or it may be a programmed digital computer, in which case the flow chart of FIG. 7 is a high level flow chart representing the relevant portion of the computer program. Referring to FIG. 6, each sample of HP OFDM data is input to an HP input buffer 50; and each sample of LP OFDM data is input to an LP input buffer 51. Input HP and LP buffers 50 and 51 each hold one sample of data at a time, although larger buffers holding a symbol at a time could be used, with data read out one sample at a time. The output of HP input buffer 50 is connected to the input of an HP output buffer 52 and the input of a comparator 53, wherein it is compared to a predetermined sample power limit 43 shown in FIG. 8. The output of comparator 53 controls a Selector 54 having selectable inputs from the output of LP input buffer 51 and the quantity zero (or its equivalent). The output of Selector 54 is connected to the input of an LP output buffer 55.

With reference to FIG. 7, The processor routine entitled "LP/HP Sample Distribution 1" begins at step 100 wherein the first HP sample of an HP OFDM symbol is loaded into HP input buffer 50 and the first LP sample of an LP OFDM symbol is loaded into LP input buffer 51. These samples are shown, for example, as sample 1 of HP OFDM symbol 40 in FIG. 8 and sample 1 of LP OFDM symbol 41 in FIG. 9. At step 102, comparator 53 compares the power of the current HP sample in HP input buffer 50 with the predetermined reference power limit 43 shown in FIG. 8. If the sample does not exceed the predetermined reference power limit, as it does not for the first HP sample of the HP OFDM symbol 40 in FIG. 8, at step 104 the HP sample in HP input buffer 50 is loaded into HP output buffer 52 and the LP sample in LP input buffer 51 is loaded into LP output buffer 55. Adder 36 receives these samples on its inputs and is triggered to add them, with the result shown in sample number 1 of the hierarchically modulated OFDM symbol 42 seen in FIG. 10. Next, it is determined at step 106 if the HP sample in HP output buffer 50 is the last HP sample of the current HP OFDM symbol. If it is not, as is the case with HP sample number 1 of HP OFDM symbol 40 in FIG. 8, the next HP and LP samples (number 2 of HP OFDM symbol 40 and number 2 of LP OFDM symbol 41) are loaded in HP input buffer 50 and LP input buffer 51, respectively, before the process returns to step 102.

This time at step 102, comparator 53 determines that the power of sample number 2 in HP OFDM symbol 40 does exceed the predetermined reference power limit 43, as shown in FIG. 8; and comparator 53 will cause Selector 54 to select zero. At step 110 the HP sample in HP input buffer 50 will be loaded into HP output buffer 52; but zero will be loaded into LP output buffer 55, leaving sample number 2 of LP OFDM symbol 41 in the LP input buffer. Adder 36 will add zero to the HP sample from HP output buffer 52, and the result will be combined sample number 2 of hierarchically modulated symbol 42 of FIG. 10, which is the unchanged HP sample number 2 from HP OFDM symbol 40. As determined in step 112, this is not the last HP sample; so at step 114, the next HP sample (number 3) from HP OFDM symbol 40 will be loaded into HP input buffer 50. Since LP input buffer 51 still holds an unused sample number 2 from LP OFDM symbol 41, no new LP sample is loaded therein.

The apparatus of FIG. 6 continues to operate in this manner until it is determined at either of steps 106 or 112 that the last sample (number 15) of HP OFDM symbol 40 has been sent to adder 36, at which point the apparatus is ready for the next HP and LP OFDM symbols. Since there are fewer LP samples in an LP OFDM symbol than there are HP samples in an HP OFDM symbol, the apparatus providing the HP and LP samples to the HP and LP input buffers 50, 51 is designed to stop providing LP samples and provide only zero inputs when all LP samples of the current LP OFDM symbol have been provided.

The embodiment of FIG. 6 and 7 displays several important characteristics that allow recovery of an LP OFDM symbol in a receiver from the hierarchically modulated symbol in which it is embedded. In the type of hierarchical modulation used herein, the secondary signal (LP OFDM digital data) that is modulated onto the primary (selected HP OFDM digital data) can be treated as noise by a receiver acting as a legacy receiver that is able to demodulate and decode the received signal for the primary data alone. Thus, recovery can be accomplished in such a receiver by demodulating and decoding the received hierarchically modulated symbol as a noisy HP OFDM symbol to recover the HP digital data therein, re-encoding and OFDM modulating the recovered HP digital symbol to provide a reconstruction of the HP OFDM symbol as originally created in the transmitter, and subtracting each sample of the reconstructed HP OFDM symbol from its corresponding sample in the received hierarchically modulated symbol to provide the samples of the LP OFDM symbol. In this embodiment, the characteristics making this possible, assuming that the receiver can demodulate the HP OFDM samples from the received, hierarchically modulated signal, can be expressed as two rules (algorithms), as defined in the flow chart of FIG. 7, with the first rule defining which HP samples are selected for association with an LP sample on the basis of sample power and HP sample order and the second rule defining the order in which the LP samples are associated with the selected HP samples.

(1) Starting with the first HP and LP samples of the next HP and LP OFDM symbols, each HP sample is compared, in original HP sample order, with a predetermined reference power limit, and is selected for association with an LP sample if it is not greater than the predetermined reference power limit, until a number of HP samples equal to the number of LP samples have been selected. This rule uses sample power comparisons to eliminate one or more of the highest powered samples of the high priority OFDM symbol from selection.

(2) The LP samples are associated in original LP sample order with selected HP samples in original HP sample order. This rule establishes a deterministic relationship between the original LP sample order and the original HP sampler order in the combined OFDM symbol, and thus enables the original LP sample order to be recovered from the original HP sample order in a receiver.

With regard to the first rule, it is an object of the described method and apparatus to reduce the power of those hierarchically modulated symbols that are most likely to clip with lower transmitter amplifier power back-off from saturation; and it accomplishes this by attempting to eliminate the highest powered samples from selection for association with LP samples in an LP OFDM symbol, since the highest powered HP samples are most susceptible to clipping when increased in power by an added LP sample). In the embodiment of FIG. 6 through 10, the predetermined reference power limit defined by line 43 is selected to divide the HP samples of a symbol into a higher powered group and a lower powered group; and a comparison of HP sample power with this predetermined reference power limit will determine whether each HP sample is in the higher or lower powered group. In general, the lower the reference power limit is, relative to the maximum possible HP sample power, the greater will be the number of higher powered HP samples in each HP OFDM symbol that are likely to be excluded from selection for an added LP OFDM symbol, and thus the more effective the reduction in clipping can become. But as this number of excluded HP samples in each HP OFDM symbol increases with lower reference power limits, the number of HP samples selectable for association with an LP sample decreases. If the reference power limit is set too low, some symbols might not have enough available selectable HP samples for all the LP samples in that symbol that need to be modulated; and LP samples might be lost. In addition, the desired LP data transmission rate is another factor to be considered. If the number of LP samples in an LP OFDM symbol is decreased relative to the number of HP samples in the corresponding symbol, fewer HP samples need to be found for association with the fewer LP samples, and the reference power limit may be lowered. But this also decreases the LP data transmission rate. And one more factor for consideration is that the reference power limit in this embodiment is predetermined for all hierarchically modulated symbols in the transmission, and the predetermined reference power limit must take into account the ranges of sample power for the entire transmission. Thus, it is the job of a designer of a specific transmitter to find the best trade-off among these parameters in a particular system.

The second rule completes the requirements for enabling recovery of the original LP OFDM symbols with their samples in their original sample order. The original LP sample order in each LP OFDM symbol must be present in or recoverable from the received combined OFDM symbol, and particularly from the original HP sample order maintained in the combined OFDM symbol. In the embodiment described above, this original LP sample order is present because the LP samples are added in the original LP sample order to the selected HP samples, which are in the original HP sample order. As long as the samples of the combined symbols retain their original HP sample order, the recovered LP samples will be in their original LP symbol order. For complete recovery of the LP samples, it is necessary that the receiver be designed to incorporate the specific first and second rules used by the transmitter in creating the combined symbols.

A second embodiment of transmitter 11 provides optimization of the reference power limit to provide assurance, in each combined symbol, that the LP samples are associated with and added to the absolute lowest HP samples available. In this embodiment, rather than comparing the power of HP samples to a predetermined reference power limit for multiple (typically all) HP OFDM symbols, the HP samples of each HP OFDM symbol are compared among themselves in a pseudo-sorting process to determine a sample power order, beginning with the lowest, of enough of the HP samples to receive the LP samples in the LP OFDM symbol. Thus, in this example, the nine lowest powered HP samples are determined and selected for association with the nine LP samples; and the sample power of the last (ninth, in this example) selected HP sample, being the highest powered HP sample with which an LP sample is associated, defines the reference power limit for the resulting combined OFDM symbol. Since this reference power limit is automatically found by the pseudo-sorting process for the nine HP samples in each HP OFDM symbol, it is not necessary to separately determine its magnitude (the nine HP samples are already identified). Also, since the reference power limit is defined separately for each HP OFDM symbol, it is a variable reference power limit providing optimal derivation of each separate combined OFDM symbol in the entire transmission. There is no concern about the reference power limit being low enough, since the process finds the lowest powered HP samples of the HP OFDM symbol. There is no need for concern about whether sufficient HP samples will be available for the LP samples, since the process picks the correct number of HP samples every time. In addition, as will be seen, the order in which the LP samples are associated with the selected HP samples does not matter, as long as it is consistent and designed into a receiver.

Figure 11:
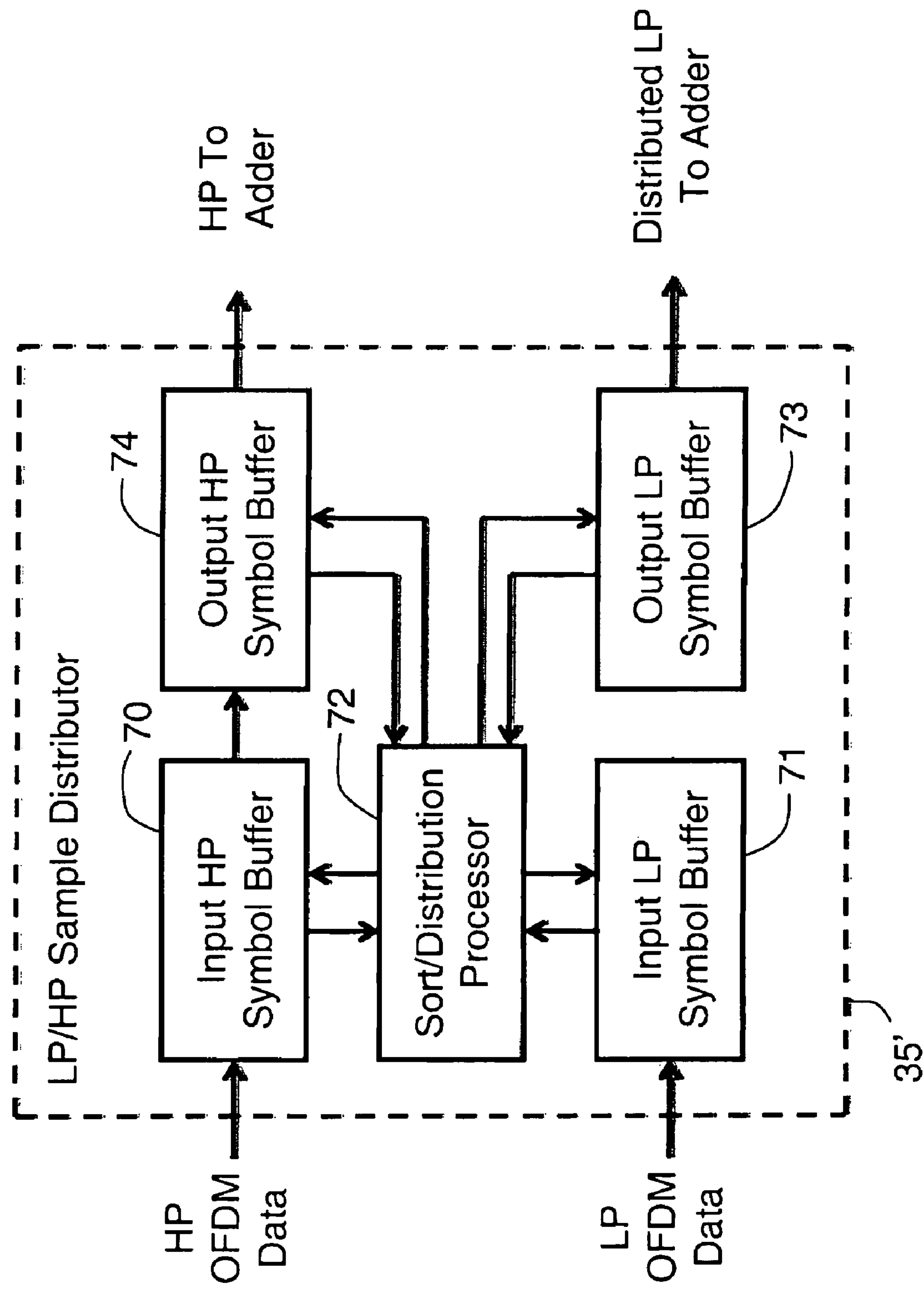
FIG. 11 is a block diagram of a second embodiment of an LP/HP sample distributor, in accordance with this invention, for use in the satellite-based transmitter of FIG. 5.
Figure 13:
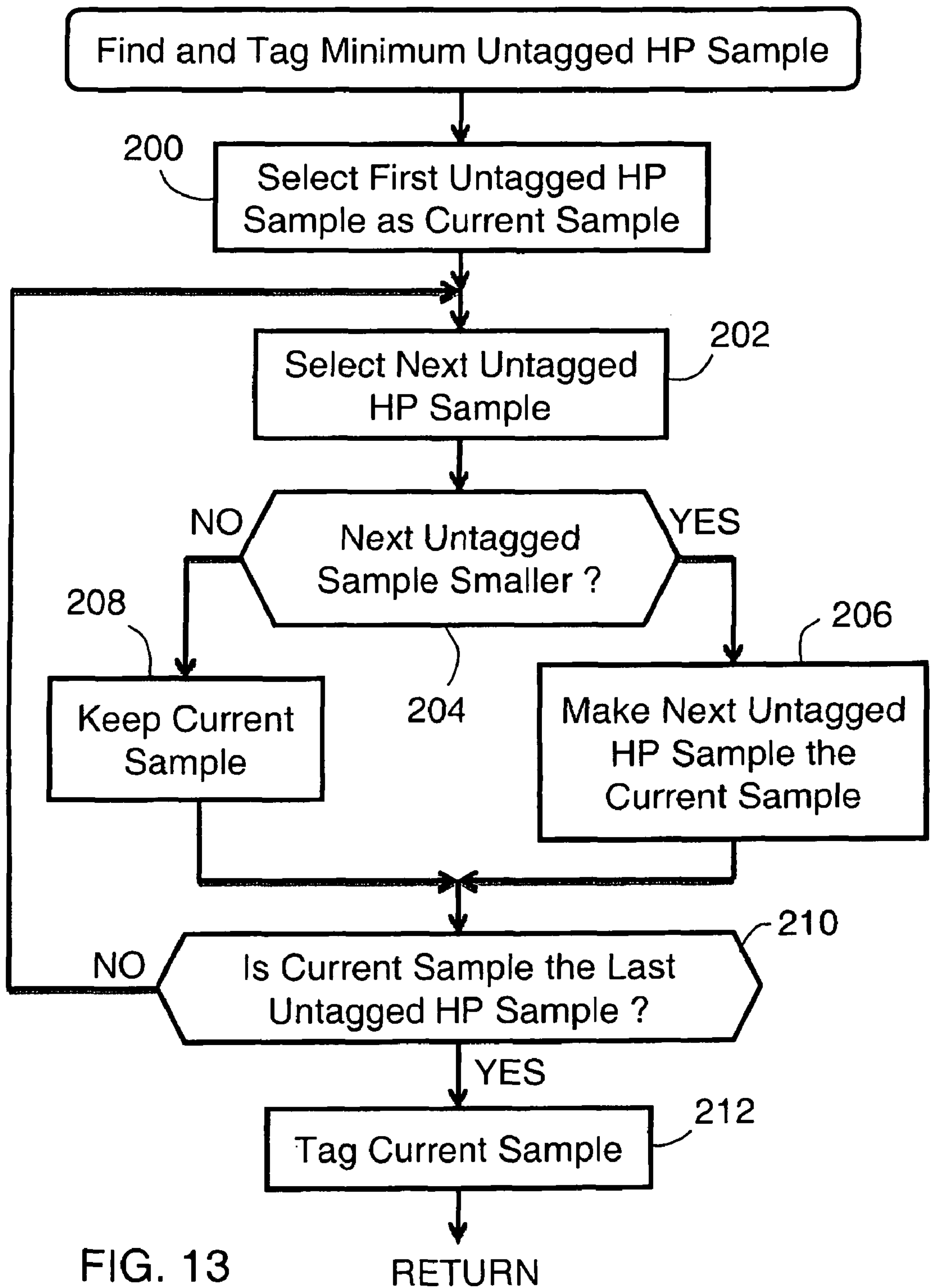
Figure 14:
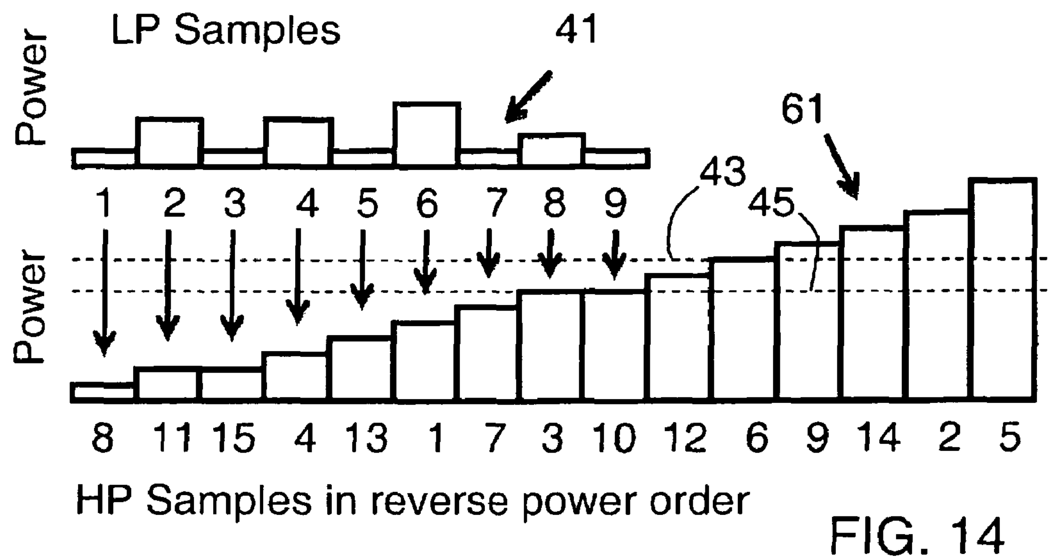
FIGS. 14, 15 and 16 are graphical representations of sample power useful in explaining the mode of operation of the LP/HP sample distributor of FIG. 11 according to the flow charts of FIGS. 12A, 12B and 13.

This second embodiment uses a modified LP/HP sample distributor 35', shown in block diagram form in FIG. 11. Its operation is described with reference to the flow chart of FIGS. 12A and 12B and that of FIG. 13, as well as the graphical portrayals of HP, LP and combined OFDM symbols in FIGS. 8, 14 and 15. Referring to FIG. 11, the fifteen HP samples of HP OFDM symbol 40, shown in FIG. 8, are input to HP symbol buffer 70; and the nine samples of LP OFDM symbol 41, shown in FIG. 14, are input to LP input symbol buffer 71. The fifteen HP samples of HP OFDM symbol 40 are stored in HP symbol buffer 70 so as to be separately accessible to sort/distribution processor 72; and each HP sample is provided with at least one additional temporary memory bit location for a TAG bit that is only used in HP symbol buffer 70. The nine LP samples of LP OFDM symbol 41 are stored in input LP symbol buffer so as to be separately accessible to sort/distribution processor 72.

The operation of LP/HP sample distributor 35' will be described with reference to the flow chart of FIGS. 12A and 12B. The process "LP/HP Sample Distribution 2" begins at step 120, wherein the HP samples of the HP OFDM symbol are read into input HP symbol buffer 70 with all samples marked as untagged. Next, at step 122, the LP samples of the LP OFDM symbol are read into input LP symbol buffer 71 with all order bits marked as unused. All HP and LP samples are stored in their respective original sample orders and will remain so in these buffers. At step 124, the untagged HP samples are scanned to determine the untagged HP sample with the smallest power. This can be done in a number of ways, and one such sub-process, entitled "Find and Tag Minimum Untagged HP sample" is shown in the sub-process flow chart of FIG. 13. This sub-process begins at step 200 by selecting the first untagged HP sample, in original HP sample order, as the current sample. The next untagged HP sample is then selected at step 202, and the smaller of the two samples will be determined by comparison at step 204. If the selected next untagged sample is smaller it becomes the new current sample at step 206. But if not (current sample is greater or equal), the current sample remains identified as the current sample at step 208. From either of steps 206 and 208, the sub-process next determines at step 210 if the current sample is the last untagged sample in the HP OFDM symbol. If the answer is no, the sub-process loops back to step 202 to repeat with the current sample and the next untagged sample in the symbol; and this loop will be repeated until all untagged samples have been tested. When this occurs, the answer at step 210 will be yes; and the remaining current sample is identified as the smallest of the untagged HP samples in the HP OFDM symbol. At step 212, the current sample is tagged, after which the sub-process will end and control will return to process "LP/HP Sample Distribution 2" from which it was called.

Figure 12A:
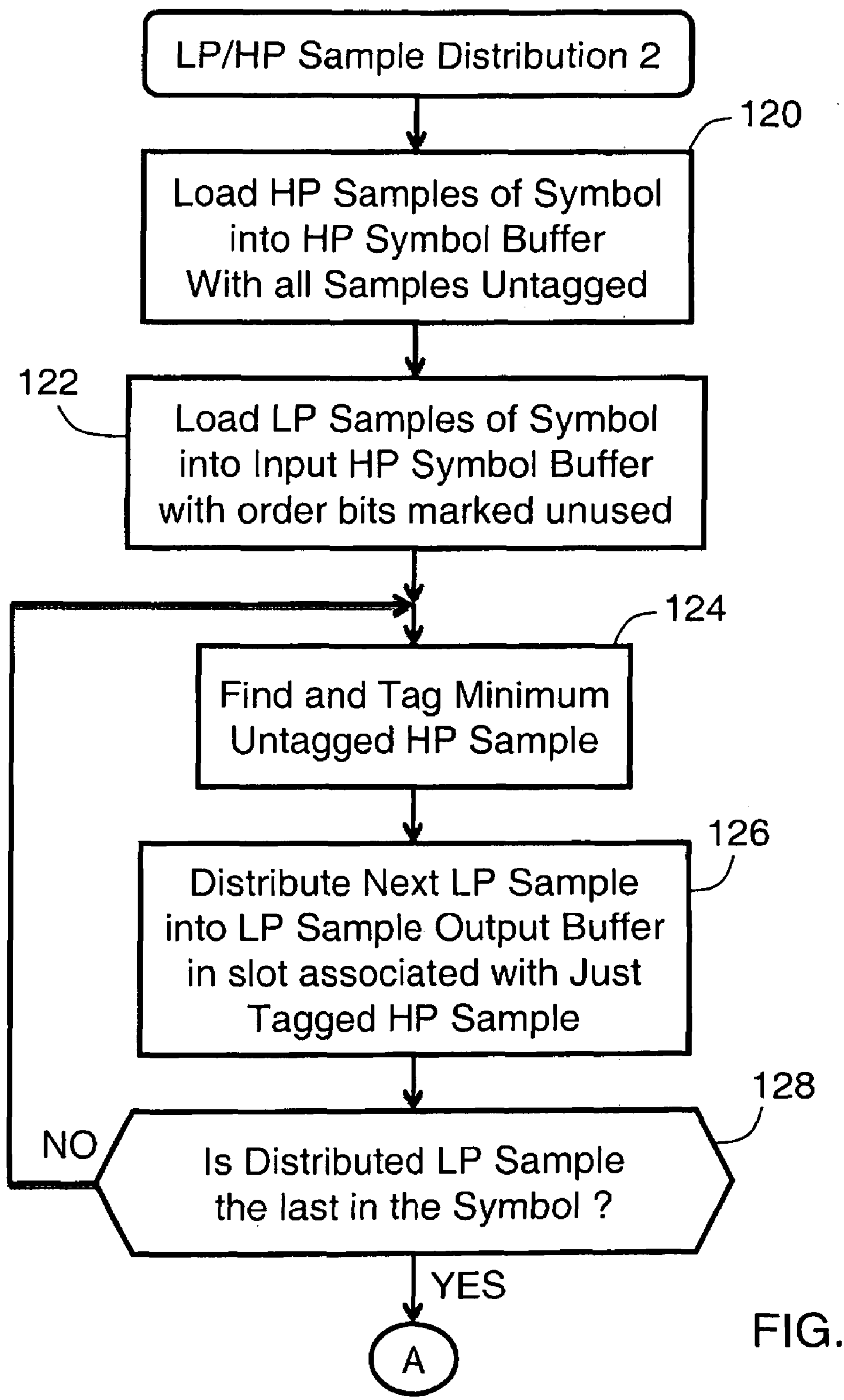
FIGS. 12A, 12B and 13 show flow charts illustrating a mode of operation of the LP/HP sample distributor of FIG. 11.

Returning to the flow chart of FIG. 12A, the HP sample just tagged at step 124 is identified as the next minimum HP sample of the HP OFDM symbol in order of increasing power. For the example of HP OFDM symbol 40 (FIG. 8) and LP OFDM symbol 41 (FIG. 14), the smallest powered sample (now tagged) is HP sample number 8. This can be seen in FIG. 14, wherein HP OFDM symbol 61 comprises the samples of HP OFDM symbol 40 rearranged from the original HP sample order to order of increasing HP sample power. At step 126, the next LP sample, in original LP sample order, is associated with this next minimum HP sample and distributed to a slot in output LP symbol buffer corresponding to the associated HP sample in the original HP sample order for read-out to adder 36. It is noted that HP sample number 8 has not been moved (it has only been tagged), and all HP samples are still in original HP sampler order. On the other hand, LP sample number 1 has now been moved out of its place in the original LP sample order and placed in a slot in output LP symbol buffer 73 associated with HP sample number 8, as shown by the vertical arrow in FIG. 14 pointing from LP sample number 1 to HP sample number 8.

Next, at step 128, it is determined whether the LP sample just distributed is the last LP sample of the LP OFDM symbol. If not, the process loops back to step 124 to find and tag the next minimum powered HP sample. Sub-process "Find and Tag Minimum Untagged HP Sample" will be called again; and this time, with one HP sample tagged, the sub-process will compare and loop one time less than the first time it was called. In the example, the next tagged sample will be HP sample number 11, which will be associated with LP sample number 2 as seen in FIG. 14. At step 126 of FIG. 12A, LP sample number 2 (the next in original LP sample order) will be distributed to the slot in output LP sample buffer 73 associated with HP sample number 11, so that it will eventually be loaded into adder 36 along with HP sample number 11.

Figure 15:
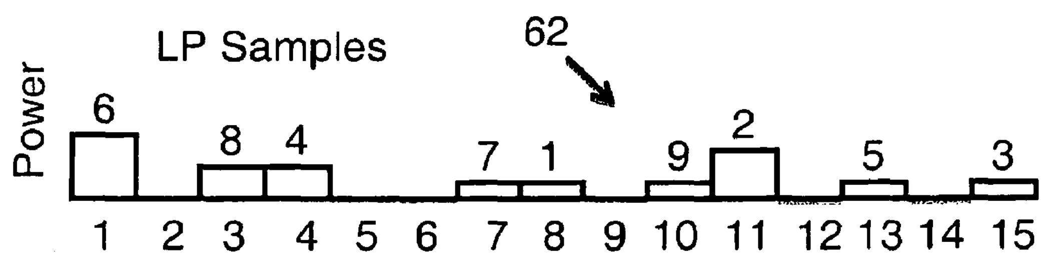

This looping of process "LP/HP Sample Distribution 2" will continue with its pseudo-sort of the HP samples by sample power and its assignment of LP samples, in original LP sample order, to slots in output LP symbol buffer 73 corresponding to the original HP sample order, until the nine smallest powered HP samples of the HP OFDM symbol (numbers 8, 11, 15, 4, 13, 1, 7, 3, 10) have been tagged and associated with LP samples (1-9, respectively). When this occurs, the answer at step 128 will be "yes;" and the process will proceed to step 130 in FIG. 12B (there is no point in sorting the last six HP samples, since all LP samples have been associated). At step 130, all the HP samples will be read to output HP symbol buffer 74, in original HP sample order and without their tags, which are no longer needed. At this point, each of the fifteen LP slots in output LP symbol buffer 73 is filled with either an LP sample or a zero, with each of the LP samples residing in a slot corresponding to its associated HP sample in output HP symbol buffer 74. This is shown in FIG. 15, which shows the LP samples in the fifteen LP sample slots of output LP symbol buffer 73, each LP sample slot having a slot number below that corresponds to the number, in original HP sample order, of the associated HP sample. The LP sample number (in original LP sample order) of each LP sample associated with an HP sample appears above the LP sample, and those LP sample slots containing no LP sample have no number above them and contain a value of zero. It can be seen that, in the output LP symbol buffer, the slots are in original HP sample original order but the LP samples are not in original LP sample order. The order of the LP samples in the combined samples is determined by the increasing sample power of their associated HP samples, beginning with the least powered HP sample.

Figure 12B:
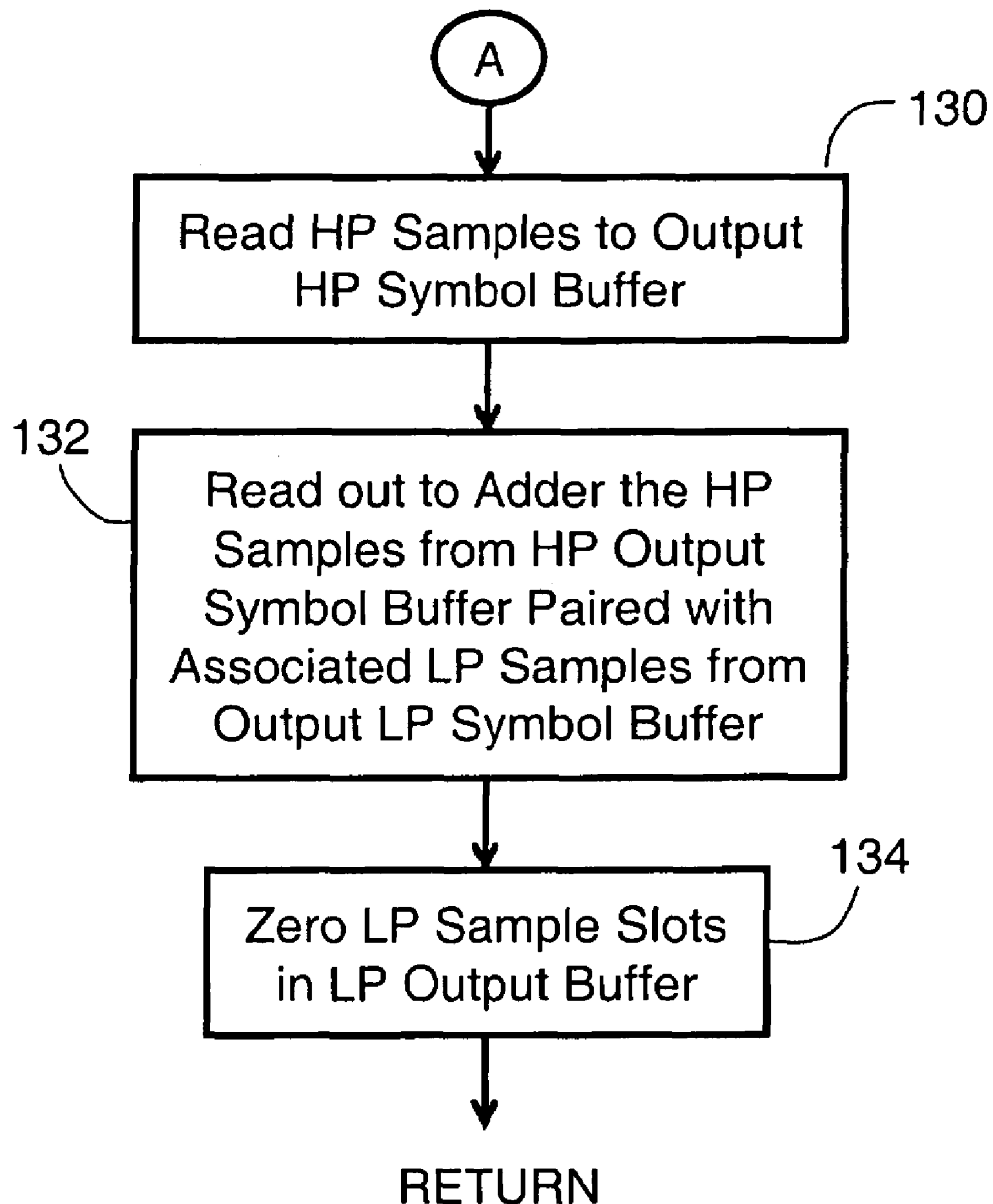

At step 132 of FIG. 12B, sort/distribution processor 72 causes the LP and HP samples to be read out in associated pairs from output HP and LP symbol buffers 74 and 73 to the two inputs of adder 36, with a zero value for each LP slot not containing an associated LP sample. After all samples have been read out, the slots of output LP symbol buffer 73 are zeroed at step 134 before the process returns for the next HP and LP OFDM symbols. The result of the additions of adder 36 is shown in FIG. 16, with each LP sample shown added to its associated HP sample.

Figure 16:
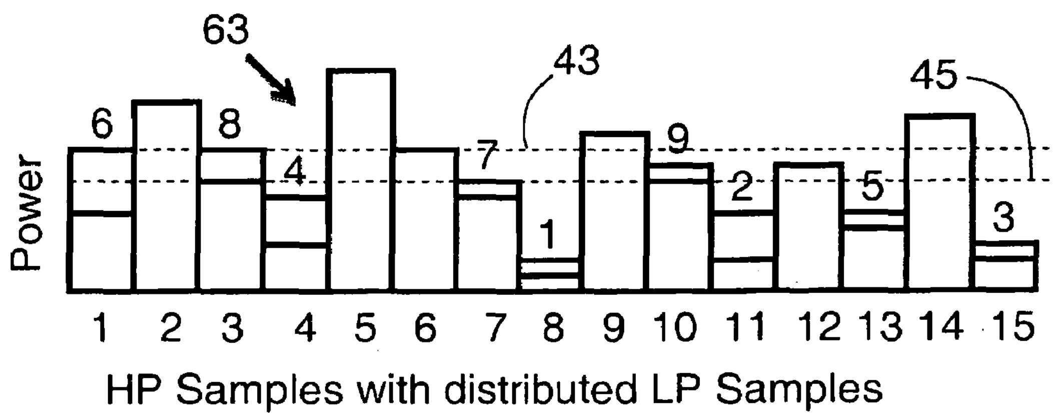

An examination of the combined symbols of FIG. 16, produced by this embodiment, provides several notable points. First, each of the selected samples of the HP OFDM symbol has a sample power no larger than any of the samples of the selected high priority OFDM symbol that are not selected. The selection process has produced a separation of the HP OFDM symbol between a lower powered group of samples selected for LP sample association and a higher powered group of samples excluded from such LP sample association that is optimal in reducing the likelihood of clipping the resulting combined OFDM symbol. Dashed line 45 of FIGS. 14 and 16 represents the sample power of HP sample number 10 and thus the sample power boundary between the two groups (HP sample number 10 in is the ninth and last HP sample to be selected, in reverse HP power order, for association with an LP sample.

It is also notable that the sample power represented by line 45 is lower than that of line 43, which is the predetermined reference power limit of the previous embodiment and which was derived for this example as representing a sample power difference between the highest powered HP sample and the highest powered LP sample, so that no combined sample power could exceed the maximum possible HP sample power. A close examination of combined symbol 62 of FIG. 10 reveals that the predetermined reference power limit represented by line 43 is not optimal for the HP OFDM symbol 40 and LP OFDM symbol 41 as shown. Two out of the three HP symbols (13 and 15) having no associated LP samples are significantly lower in power than several of the earlier HP samples, in original HP sample order, that do have associated LP samples. In fact, the variable reference power limit of line 45 in FIGS. 14 and 16 would work perfectly as a predetermined reference power limit for OFDM symbols 40 and 41 using the LP/HP sample distributor of FIG. 6-10: it would associate LP symbols with the nine HP samples numbered 1, 3, 4, 7, 8, 10, 11, 13, 15. But it would be risky to apply the sample power represented by line 45 blindly to all combined symbols of a transmission in which HP OFDM symbol 40 is typical, since a slight increase in sample power in only a single HP sample of HP OFDM symbol 40 could require a higher reference power limit to avoid coming up short in selected HP samples (only 8 selected) and thus losing the last LP sample. For example, if HP sample number 3 were increased slightly to the level of sample number 12, there would be only 8 HP samples in HP OFDM symbol 40 having a sample power no greater than that of reference power limit 45; and the previous embodiment of FIG. 6-10 using line 45 as a predetermined reference power limit would run out of selected HP samples prior to the assignment of LP sample number 9. But the embodiment of FIG. 11-16 would have no problem with the same modified HP OFDM symbol, because it is not constrained by a predetermined reference power limit. It would adapt to the modified HP OFDM symbol automatically by determining in its pseudo-sort process which HP samples were the lowest in sample power and select them, defining a slightly higher variable reference power limit in the process.

A second notable point of this embodiment is that the LP samples are not associated with the selected HP samples in original HP sample order; they are instead associated in order of increasing HP sample power, beginning with the lowest powered HP sample. But this does not prevent recovery of the LP samples in original LP sample order, since the LP samples are assigned by a rule allowing derivation of the original LP sample order from a physical characteristic of the original HP sample order of the samples with which they are associated. With knowledge of this rule, the receiver may apply the same pseudo-sort process to determine which LP samples, in original LP sampler order, are associated with which HP samples, in order of increasing sampler power, and thus derive the original LP sample order.

In view of these characteristics and the flow charts of FIGS. 12A, 12B and 13, the rules in this embodiment for recovering the LP digital data from the HP digital data can be stated as follows:

(1) The HP samples are selected by identifying the HP samples, equal in number to the number of LP samples, that are lowest in sample power, wherein HP samples that are indistinguishable in sample power are considered increasing in sample power in their original HP sample order. This rule eliminates one or more of the highest powered HP samples from selection based on sample power comparisons.

(2) The LP samples, in original LP sample order, are associated with the selected HP samples in the order of increasing HP sample power, beginning with the lowest powered HP sample and continuing until all LP samples are associated. This rule establishes a deterministic relationship between the original LP sample order and the original HP sampler order in the combined OFDM symbol, and thus allows the original LP sample order to be recovered from the original HP sample order in a receiver.

But although this embodiment as described associates the LP samples in order of increasing HP sample power, it does not require this LP sample order. The LP samples may, for example, be associated according to the second rule of the previous embodiment:

(2) The LP samples are associated with selected HP samples in original LP sample order. This rule likewise establishes a deterministic relationship between the original LP sample order and the original HP sampler order in the combined OFDM symbol, and thus allows the former to be recovered from the former in a receiver.

Figure 17A:
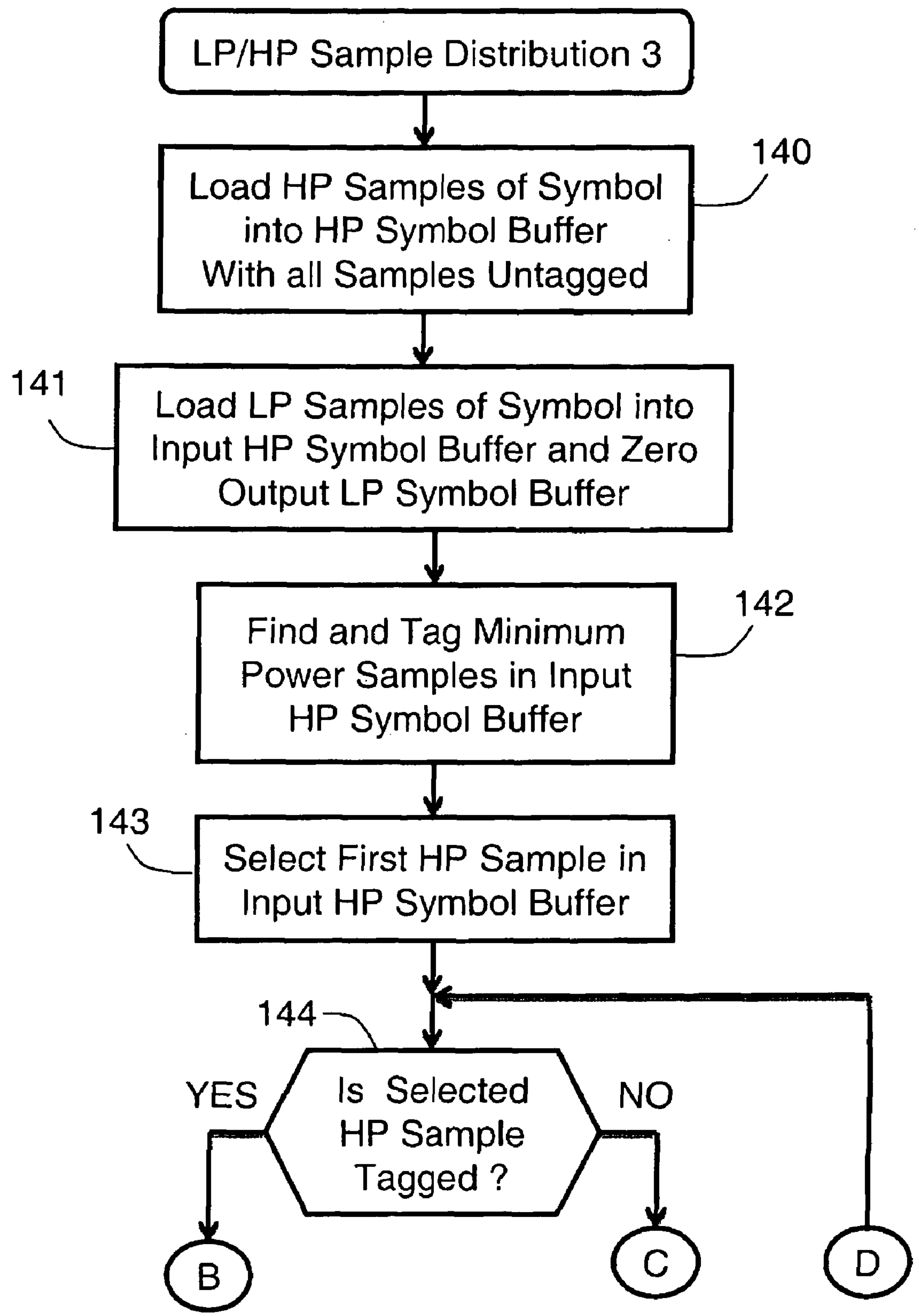
FIGS. 17A and 17B show a flow chart illustrating an alternative operation of the LP/HP sample distributor of FIG. 11.
Figure 17B:
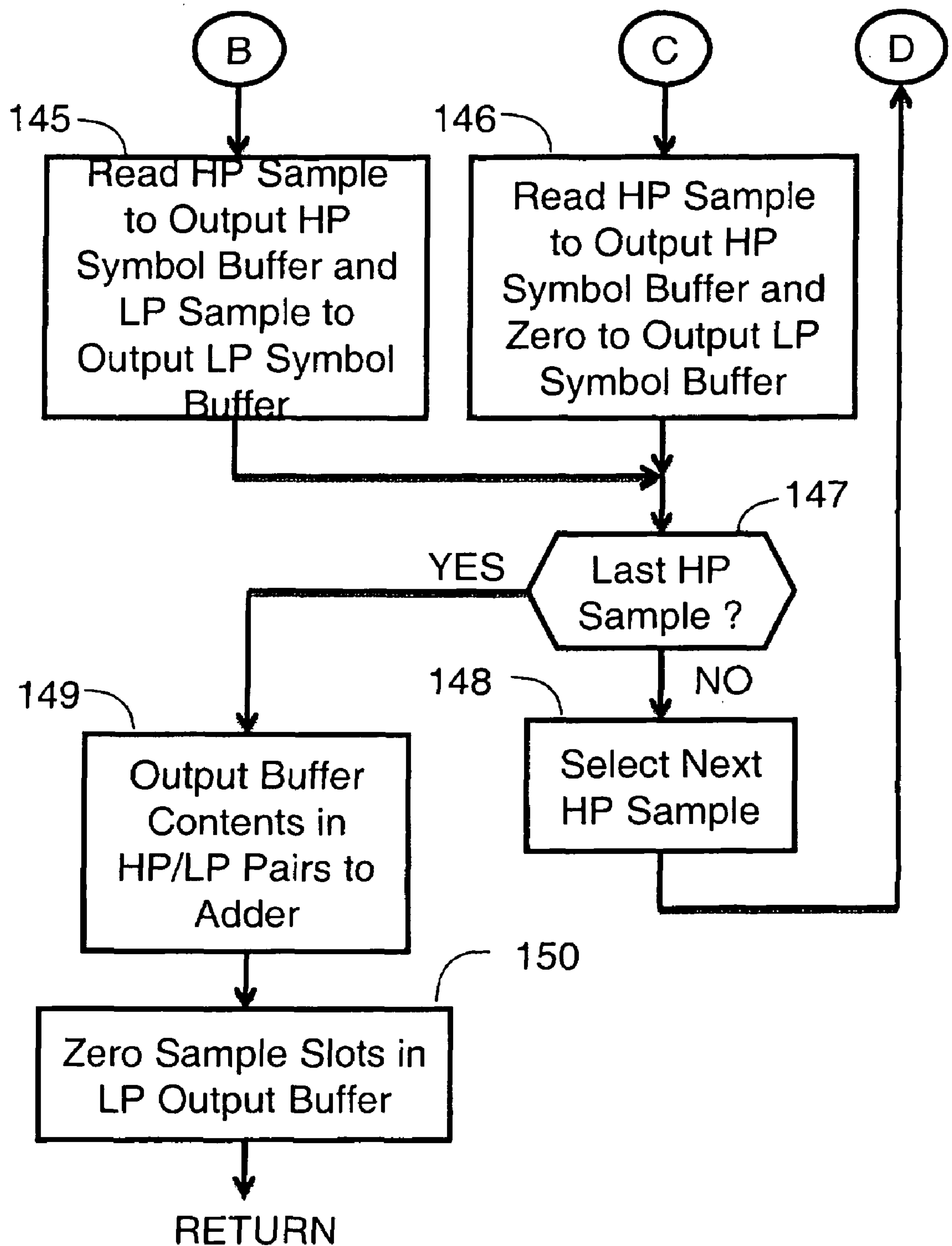

This rule requires a modification to the operation of LP/HP sample distributor 35' of FIG. 11, according to the flow chart of FIGS. 17A and 17B. The process "LP/HP Sample Distribution 3" begins with step 140 in FIG. 17A wherein the fifteen LP samples of an HP OFDM symbol are loaded into input HP symbol buffer 70 with all HP samples untagged. At step 141, the nine samples of an LP OFDM symbol buffer are loaded into input HP symbol buffer 71, and all slots of output LP symbol buffer 73 are zeroed. At step 142, the minimum power samples of the HP OFDM symbol are found and tagged as previously described with reference to the loop comprising steps 124-128 of the process "LP/HP sample distribution 2" shown in the flow chart of FIGS. 12A and 12B, including sub-process "Find and Tag Minimum Power Sample" of FIG. 13. But in the currently described process, no LP samples are distributed to output LP symbol buffer 73 as they are in step 126 of "LP/HP sample distribution 2."

With the nine minimum powered HP samples in input HP symbol buffer 70 tagged, the process "LP/HP Sample Distribution 3" proceeds to distribute the LP samples of the LP OFDM symbol by associating them with the tagged HP samples of the HP OFDM symbol in the output HP and LP symbol buffers while retaining the original sample orders of both HP and LP samples in their respective symbols. At step 143, the first HP sample in input HP symbol buffer 70 is selected. At step 144, it is determined whether the selected HP OFDM symbol (the first in this case) is tagged. If it is tagged, the HP sample and the first LP sample in the input LP symbol buffer are read out to their respective output symbol buffers 74 and 73 at step 145. But if the selected HP OFDM symbol is not tagged, at step 146 the first HP sample from input HP symbol buffer 70 is read to output HP symbol buffer 74 while no LP sample is read into the corresponding LP sample slot in output LP symbol buffer 73, thus leaving that LP sample slot with a zero. From either of steps 145 and 146, the process proceeds to step 147, wherein it is determined whether the selected HP sample is the last HP sample in the input HP sample buffer. If it is not, the process selects the next HP sample in input HP symbol buffer 70 at step 148 and returns to step 144 for another loop. The looping continues filling the output HP and LP symbol buffers with paired HP and LP samples in their original sample orders, but with LP samples from input LP symbol buffer paired only with HP samples that were tagged in input HP symbol buffer 70 by sort/distribution processor 72 and zero LP sample values paired with the HP samples that were not so tagged. When, at step 147, the last HP sample is detected, at step 149 the HP samples from output HP symbol buffer 74 and the LP and zero value samples from output LP symbol buffer 73 are read, pair by pair, to adder 36 of FIG. 5. At step 150, the LP sample slots in output LP symbol buffer 73 are zeroed before the process returns to prepare for the next HP and LP OFDM symbols.

Figure 18:
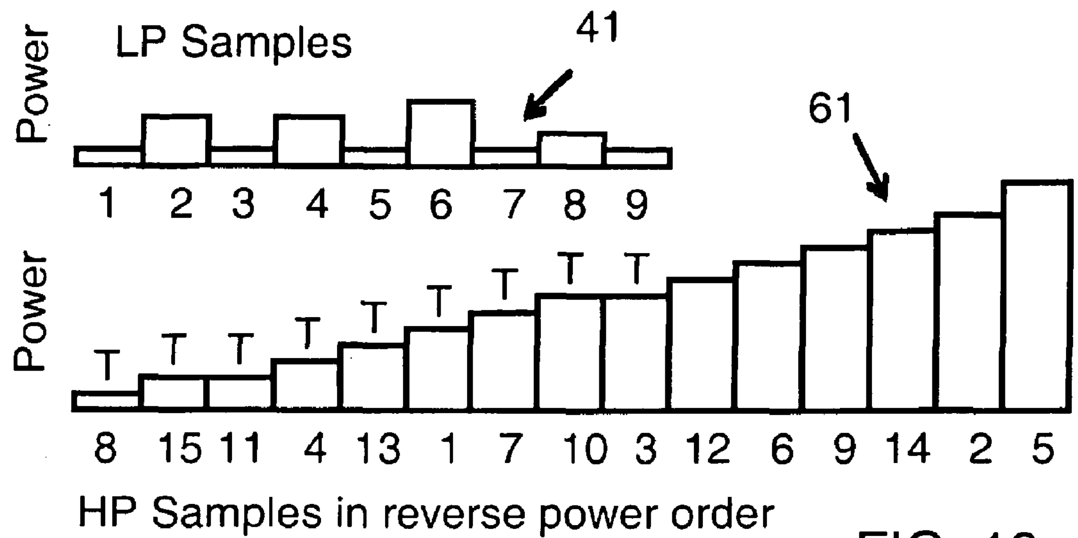
FIGS. 18, 19 and 20 are graphical representations of sample power useful in explaining the operation of the LP/HP sample distributor of FIG. 11 according to the flow chart of FIGS. 17A and 17B.
Figure 19:
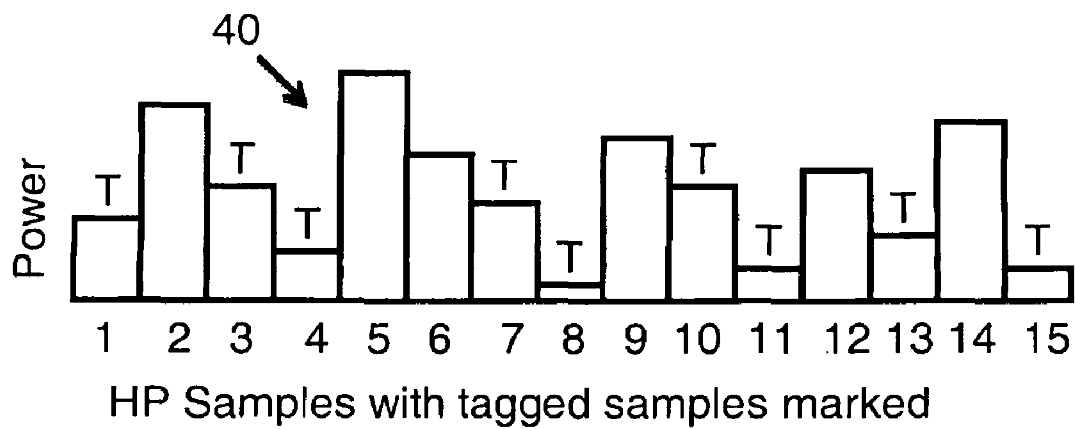
Figure 20:
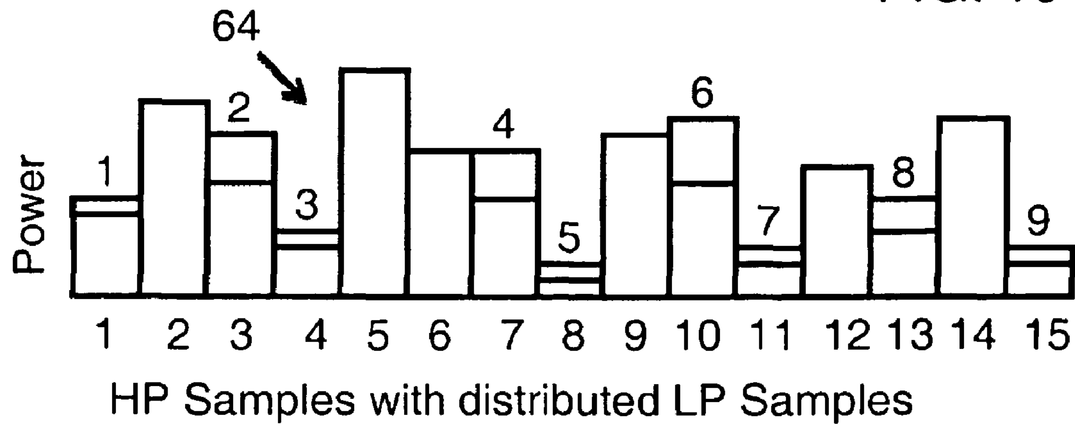

The result of the LP/HP sample distribution of FIGS. 17A and 17B can be seen in the graphical presentations of FIGS. 18, 19 and 20. FIG. 18 shows LP OFDM symbol 41 of the example with samples in original LP sample order. FIG. 18 also shows example HP OFDM symbol 61 in order of increasing power, but with the nine minimum power (tagged) samples marked with a "T" immediately above them. For these nine tagged samples, the order shown is the order in which they are tagged in the process of FIGS. 17A and 17B, but they are never actually changed in order (in the buffer) from their original HP sample order, which is indicated by the numbers below the samples. FIG. 19 shows the example HP OFDM symbol 40 in input HP symbol buffer 70 with the nine minimum power samples marked by a "T." FIG. 20 shows the combined symbol 64 with both HP and LP samples in their respective original sample orders and LP samples found only on HP samples shown tagged in FIG. 18. It can be seen that the HP samples that are modulated by LP samples are the same for each of the hierarchically modulated symbol 64 of FIG. 19 and the hierarchically modulated symbol 63 of FIG. 16, but the order of the LP samples is different: (a) original LP sample order for the LP samples in symbol 64 of FIG. 19 and (b) order determined by the reverse sample power order of their associated HP samples for the LP samples in symbol 63 of FIG. 16. Each of these orders of LP samples is obtained by a consistent, deterministic rule that preserves knowledge of the relationship between the original LP sample order and the original HP sample order; and this allows a receiver to reconstruct the LP OFDM signal from the HP OFDM signal, as long as it is able to demodulate the HP OFDM signal from the received hierarchically modulated signal. This modification of the embodiment described by the flow chart of FIGS. 12A and 12B shares the advantages of that embodiment that result from determining the lowest powered HP samples of each HP OFDM symbol for association with the LP samples of the corresponding LP OFDM symbol, the only difference being the order of the LP samples in the hierarchically modulated signal.

The flowchart of FIGS. 17A and 17B shows that the order of association of the LP samples with the selected nine lowest powered HP samples could be any order at all if the HP samples are first selected as the lowest powered samples in the HP OFDM symbol. It is in step 145 that each LP sample is read from its slot in input LP symbol buffer 71 and distributed into the slot in output LP symbol buffer 73 corresponding to the associated HP sample. To obtain the original LP sample order, one reads out the LP samples in this step in successive loops in their original LP sample order, that is, according to a sample order sequence 123456789, where each digit identifies the LP sample slot in input LP symbol buffer 71. A receiver can recover the original LP sample order from the HP sample order of the associated HP samples with knowledge of the sequence. But this implies that the LP samples could be picked in any sequence of those nine digits (629478135, for example) for placement in output LP symbol buffer 73 in step 145 during multiple loops of the process, as long as the receiver incorporated knowledge of the sequence. In this case, the second rule of the previous embodiment would be rewritten as:

(2) The LP samples are associated with selected HP samples in the sequence 629478135, wherein each digit represents the place of an LP sample in original LP sample order.

Figure 21:
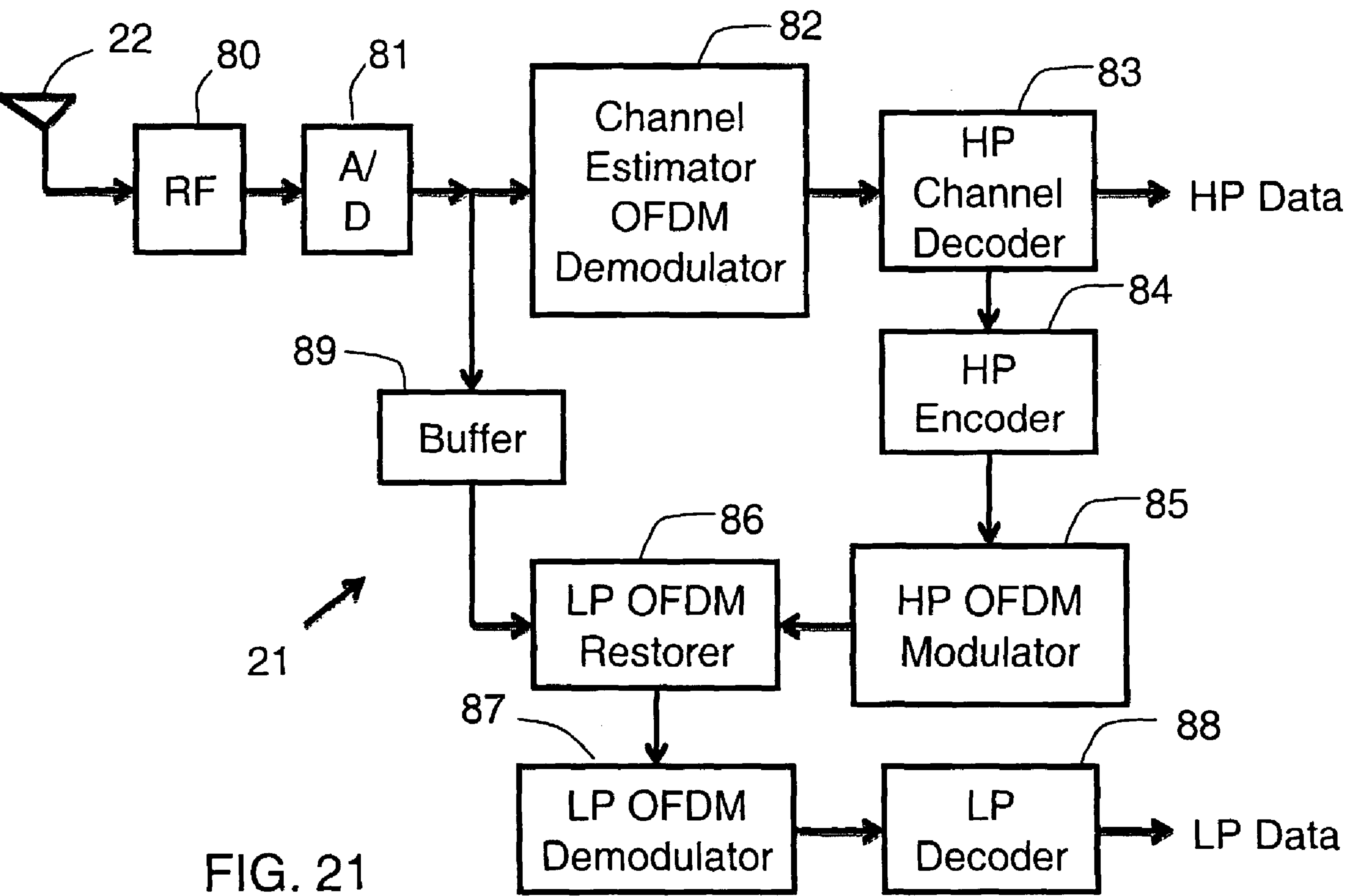
FIG. 21 is a block diagram of an embodiment of a receiver for use in the earth-based communication units of FIG. 2 or FIG. 3.

FIG. 21 shows a block diagram of receiver 21 (FIG. 2) capable of receiving and demodulating the OFDM signal broadcast from transmitter 11 (FIG. 4) in satellite 10, using the transmitter embodiment producing an output hierarchically modulated signal using LP/HP sample distributor 35 of FIG. 6 according to the flow chart of FIG. 7. The description also applies to receiver 25 (FIG. 3) producing its output in the same process. Referring to FIG. 21, the broadcast signal received on antenna 22 is provided to radio frequency (RF) receiver front end 80, the output of which is provided to analog-to-digital (A/D) converter 81. The digital signal from A/D converter 81 is processed with a Fast Fourier Transform (FFT) in Channel Estimator OFDM Demodulator 82; and the output of Demodulator 82 appears as a somewhat noisy, FEC (turbo) encoded HP data signal. Processing this signal through HP Channel Decoder 83 yields the original HP data.

In order to recover the original LP data, the HP data from HP Channel Decoder 83 is used to reconstruct the original HP OFDM symbols; and this is accomplished in HP Encoder 84 and HP OFDM Modulator 85, which mimic the processing of HP Encoder 30 and HP OFDM Modulator 31 in Transmitter 11 of FIG. 5. The output of HP OFDM Modulator 85 includes an essentially identical copy of, for example, HP OFDM symbol 40 of FIG. 10. The HP OFDM symbol 40, for example, from HP OFDM Modulator 85 is provided to an LP OFDM restorer 86; and the corresponding received combined OFDM symbol from A/D converter 81 is also provided, through a delay buffer 89, to LP OFDM restorer 86, wherein the HP samples of the reconstructed HP OFDM symbol are subtracted from corresponding samples of the combined OFDM symbol to create the original LP OFDM symbol using knowledge of the predetermined rules used in LP/HP Distributor 35 and adder 36 of Transmitter 11 in FIG. 5 (The reconstructed HP OFDM symbol is that derived from its "corresponding" received combined OFDM symbol in blocks 82-85). The output of LP OFDM restorer 86 is processed through LP OFDM Demodulator 87 and LP Decoder 88 to provide the output LP digital data.

Figure 22:
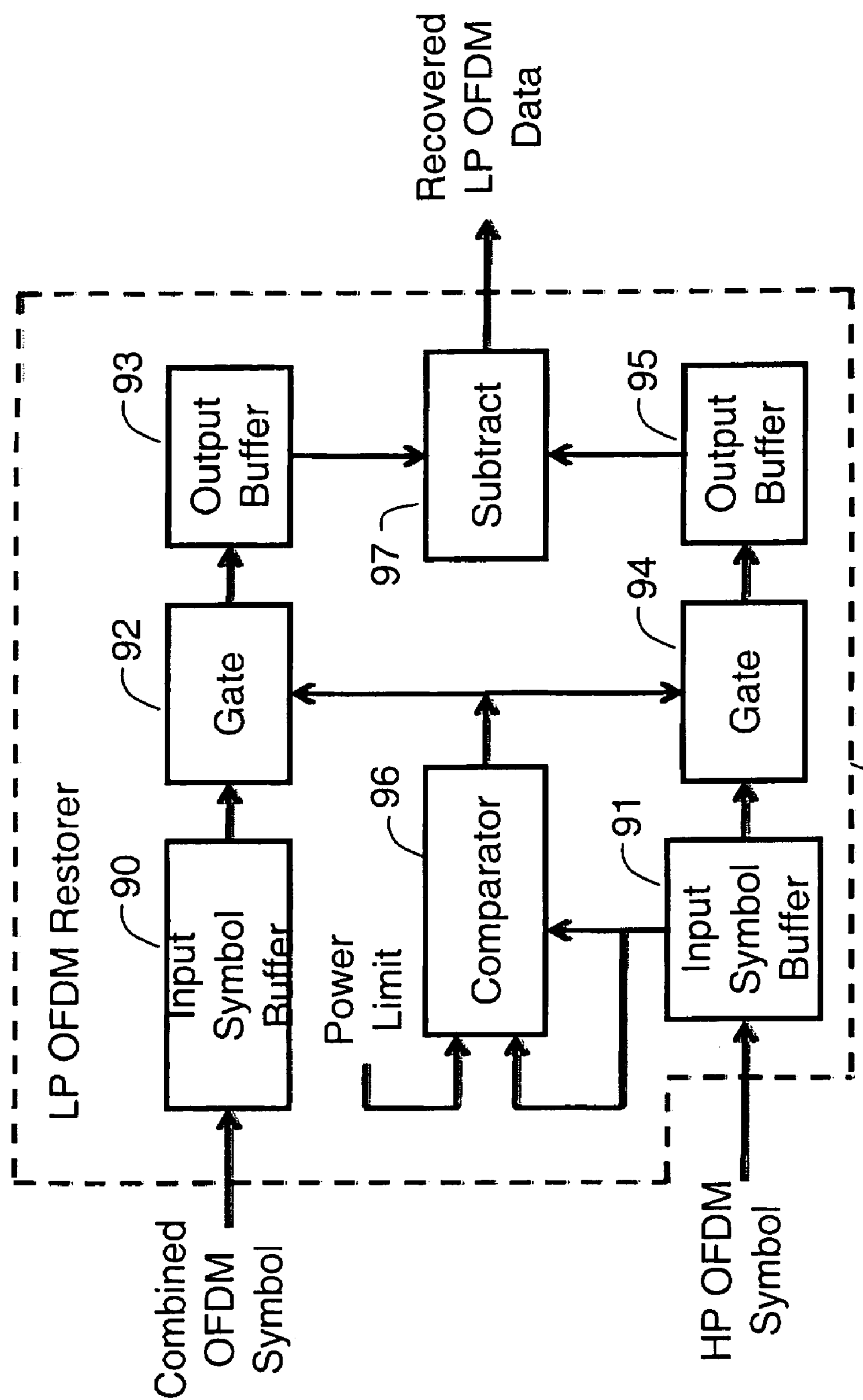
FIG. 22 is a block diagram of an LP OFDM restorer for use in the receiver of FIG. 21.
Figure 23:
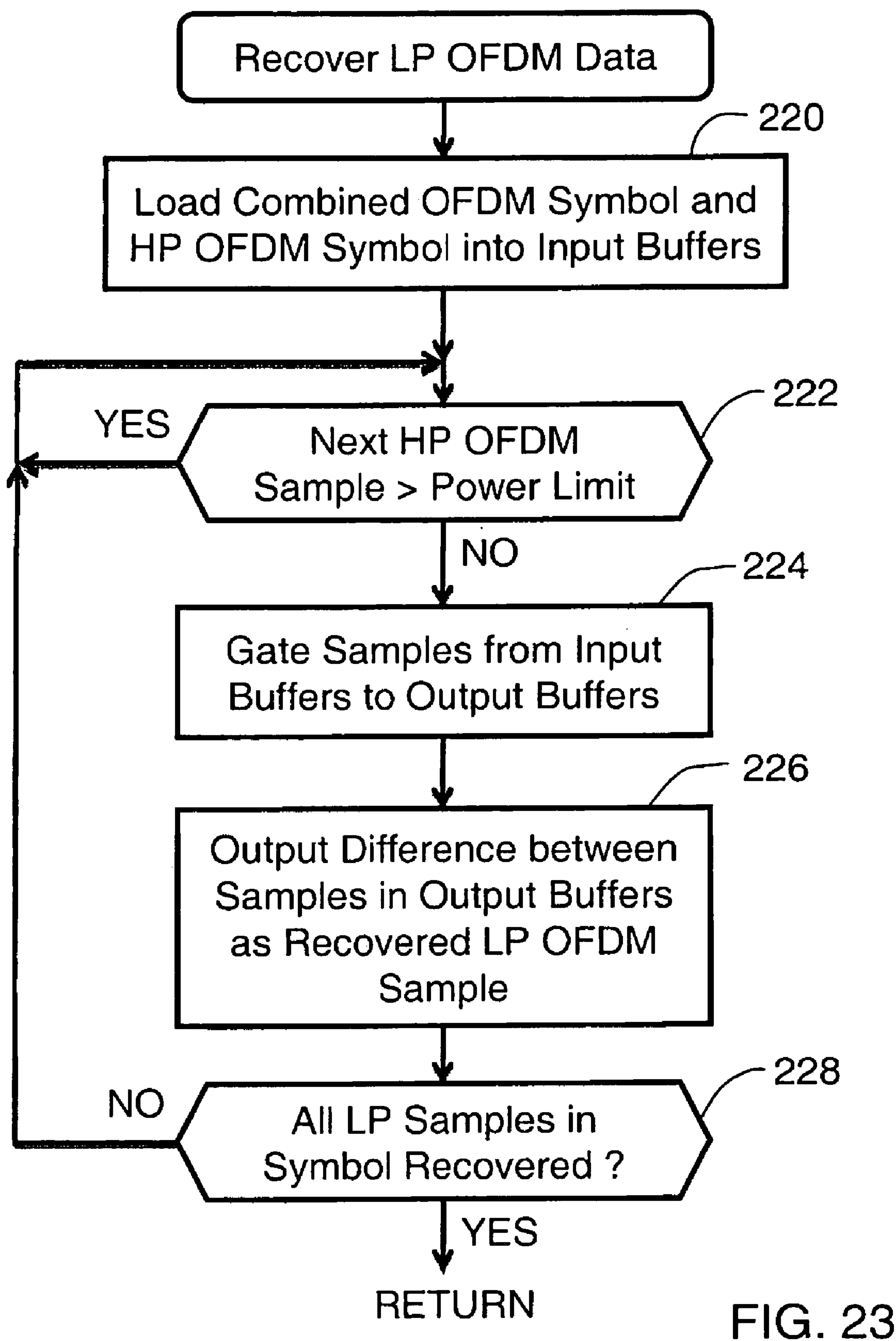
FIG. 23 is a flow chart illustrating the operation of the LP OFDM restorer of FIG. 22.

Most of the blocks of receiver 21 are well known in the RF communications art and will not be further described in detail. LP OFDM restorer 86 is, however, particularly constructed according to this invention for use in receiver 21 and is now described with reference to FIG. 22. LP OFDM restorer 86 has an input symbol buffer 90 for receiving combined OFDM symbols from A/D Converter 81 via delay buffer 89 and an input symbol buffer 91 for receiving reconstructed HP OFDM symbols from HP OFDM modulator 85. Input symbol buffer 90 has an output connected through a gate 92 to an output buffer 93. Input symbol buffer 91 has an output connected through a gate 94 to an output buffer 95 and also connected to an input of a comparator 96, the other input of which is provided with the same predetermined reference power limit 43 provided to comparator 53 in HP/LP sample distributor 35 shown in FIG. 6. Finally, the outputs of output buffers 93 and 95 are provided to the inputs of subtract block 97 such that the reconstructed HP OFDM sample in output buffer 97 is subtracted from the corresponding sample of the combined OFDM symbol in output buffer 95. The output difference from subtract block 97 is the LP OFDM sample recovered from the sample (of the combined OFDM symbol) that is in output buffer 93.

The operation of LP OFDM restorer 86 is described with the flow chart of FIG. 14 in a process entitled "Recover LP OFDM Data 1." The process begins at step 220 by loading a combined OFDM symbol of the from delay buffer 89 into input symbol buffer 90 and a corresponding reconstructed HP OFDM symbol into input symbol buffer 91, each overwriting the previous contents of the last symbol. At step 222, comparator 96 determines whether the first HP OFDM sample in input symbol buffer 91 exceeds the predetermined reference power limit 43 used in the transmitter to decide whether or not an LP OFDM sample would be added to the HP OFDM sample being tested. If it does not exceed this reference power limit, then an LP OFDM sample is assumed to be recoverable from the corresponding sample of the combined OFDM symbol in input symbol buffer 90. Thus, at step 224, the tested HP sample in input symbol buffer 90 and the corresponding sample from the combined OFDM symbol in input symbol buffer 91 are gated to their respective output buffers 93 and 95 so that the HP sample in output buffer 95 can be subtracted from the sample in output buffer 93 by subtract block 97, with the difference output as the next LP OFDM sample at step 226. This is followed at step 28 by a determination of whether the last LP sample has been recovered. If it has not, then the process loops back to test the next HP sample in input symbol buffer 91. If the first HP OFDM sample had exceeded the predetermined reference power limit at step 222, then the process would have assumed that no LP sample was recoverable from the corresponding sample in the combined OFDM symbol, and it would have looped back to step 222 to test the next HP sample in input symbol buffer 91 without gating any samples to the output buffers for subtraction. This process continues to loop and recover LP samples in the described manner until the last LP sample in the original LP OFDM symbol 41 is detected at step 228, at which the process returns to load the next combined and HP OFDM samples into input symbol buffers 90 and 91.

A second embodiment of the receiver 21 in Communication Unit 20 is similar to receiver 21 except that it is designed to demodulate and recover the HP and LP OFDM data broadcast by transmitter 11 using the LP/HP sample distributor 35' and producing an output with symbols such as symbol 63 of FIG. 16. This second embodiment differs in having a revised LP OFDM restorer 86' in place of LP OFDM restorer 86 in FIG. 21; and this revised LP OFDM restorer 86' is shown in the block diagram of FIG. 24.

Figure 24:
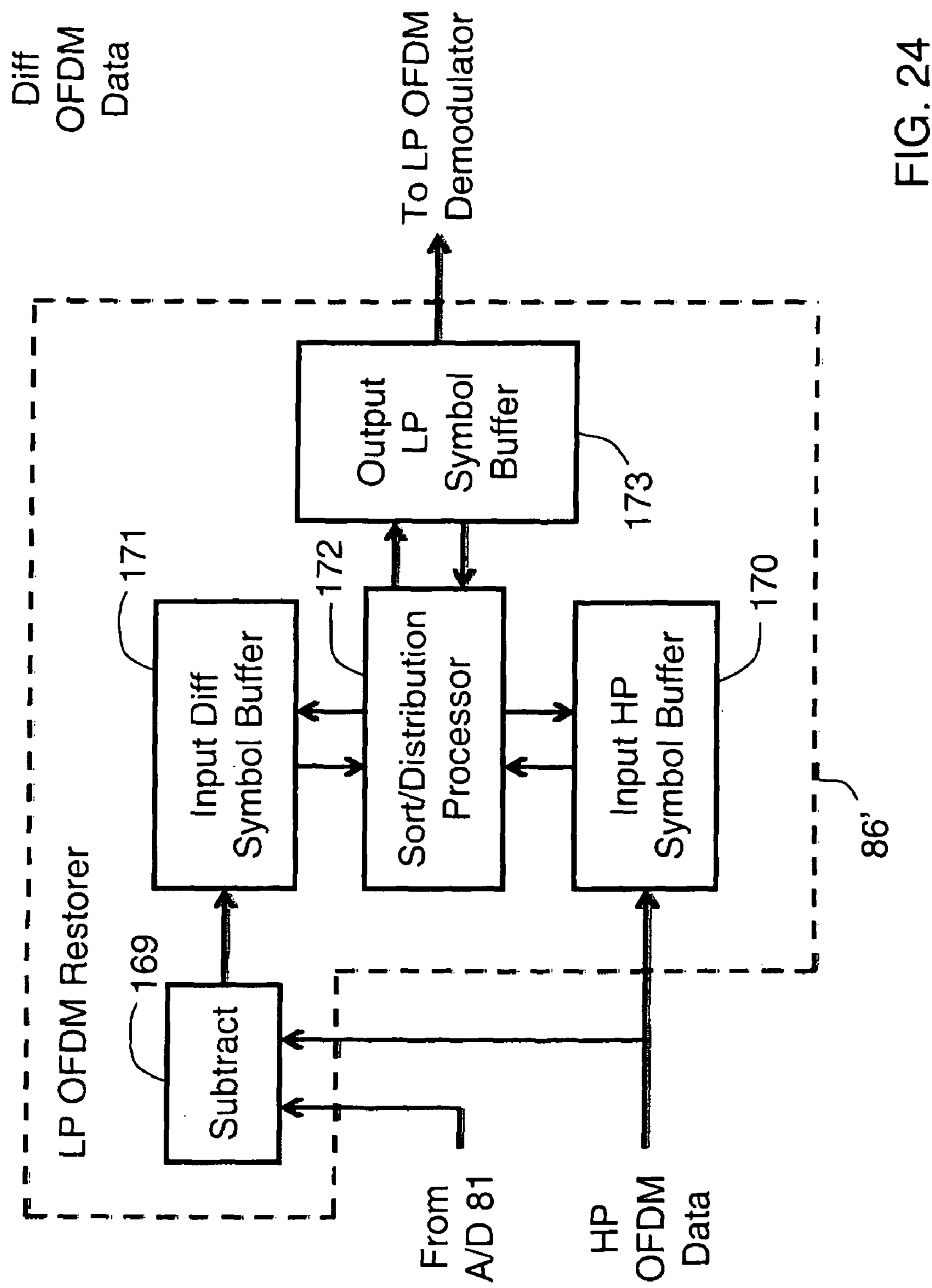
FIG. 24 is a block diagram of an alternative LP OFDM restorer for use in the receiver of FIG. 21.

Referring to FIG. 24, LP OFDM restorer 86' has a subtract block 169 that receives reconstructed HP OFDM samples from HP OFDM modulator 85 on a first input to be subtracted from corresponding samples output by A/D converter 81 and delayed as required by buffer 89, the latter samples being received on a second input. The word "corresponding" is again used to signify that the samples involved in each subtraction are both derived from the same sample of the same combined symbol in the received signal. The HP OFDM samples are also provided to an input HP symbol buffer 170 and collected therein for a complete HP OFDM symbol, while the results of each subtraction in subtract block 169, called "Diff samples" herein, are provided to an input Diff symbol buffer 171 and accumulated for a Diff symbol of 15 samples corresponding to the HP OFDM symbol. Since (1) the output of A/D converter 81 comprises the received hierarchically modulated transmission in the form of a series of combined OFDM symbols, (2) each of the corresponding HP and Diff samples loaded into its respective input symbol buffer is derived from the same sample of the same combined OFDM symbol from A/D converter 81, (3) each sample of a combined OFDM symbol is either an HP sample or the sum of an HP sample and an associated LP sample, and (4) each Diff sample is derived by subtracting an HP sample from its corresponding sample in the combined OFDM symbol, several things follow logically. First, nine of the fifteen Diff samples in the Diff symbol represent recoverable LP OFDM samples associated with the lowest powered HP samples of the HP OFDM symbol stored in input HP symbol buffer 170; second, the order of association is based on the relative power of the associated HP symbols; and third, using this knowledge, the LP samples are recoverable.

Continuing with FIG. 24, a sort/distribution processor 172 communicates with both input HP symbol buffer 170 and input Diff symbol buffer 171, as well as output LP symbol buffer 173. Sort/distribution processor 172 is similar to sort/distribution processor 72 of transmitter 11 in FIG. 11 and may be embodied in dedicated digital circuitry a programmed digital computer, or a combination of the both.

Figure 25:
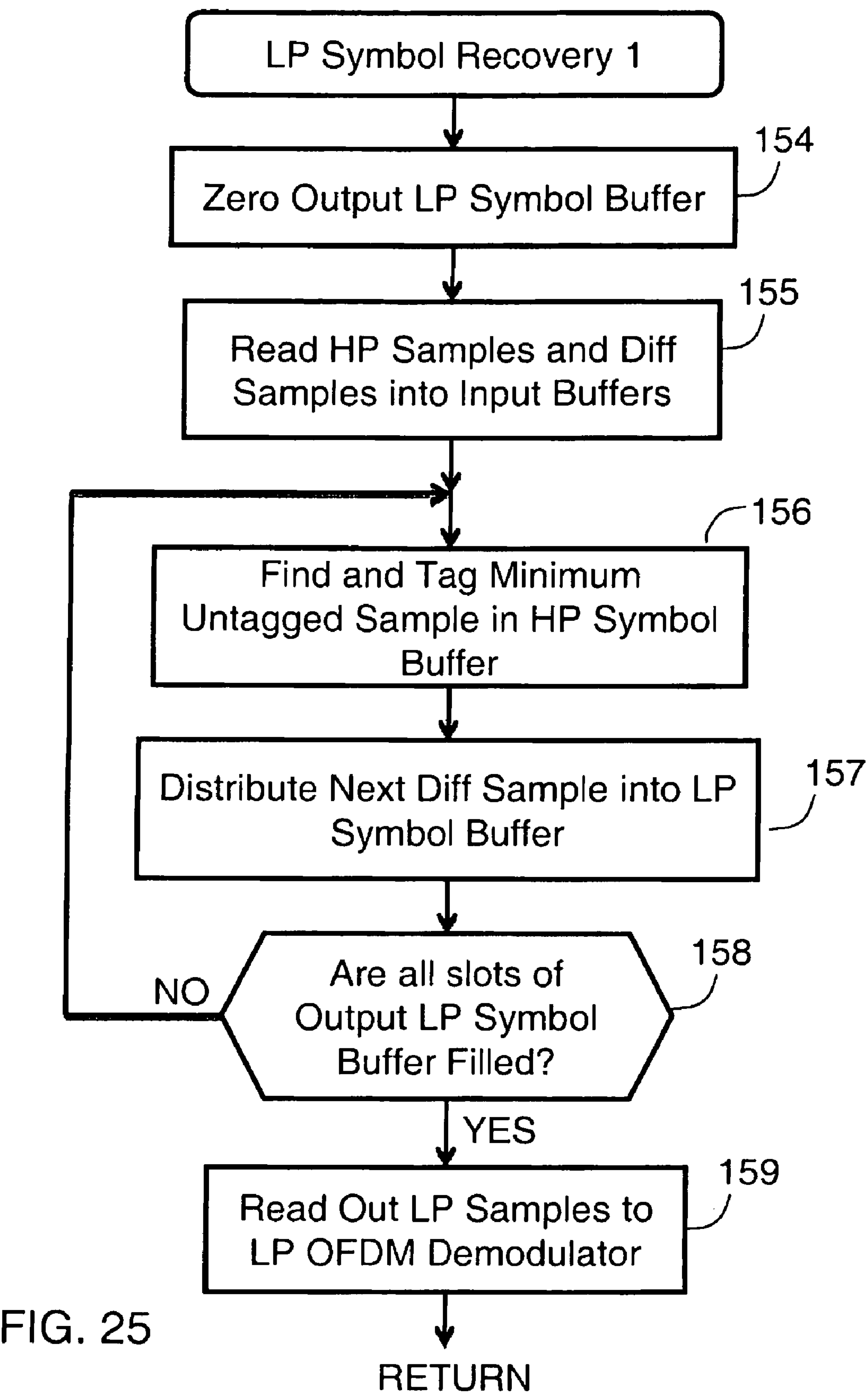
FIG. 25 is a flow chart illustrating the operation of the LP OFDM restorer of FIG. 24.

The recovery process performed by sort/distribution processor 172 will be described with reference to the flow chart of the process entitled "LP OFDM Symbol Recovery 1," shown in FIG. 25. It is noted at the start that, due to the possibility of noise in the Diff samples, this process does not attempt to identify the Diff samples by their power levels. Instead, it relies on examinations of the comparatively noise-free HP samples and applications of the rules governing the LP/HP associations. The process begins at step 154 by zeroing all nine sample slots of output LP symbol buffer. It continues by loading the fifteen HP samples of an HP OFDM symbol from HP OFDM modulator 85 into input HP symbol buffer 170 and the fifteen Diff samples of a Diff symbol from subtract block 169 into input Diff symbol buffer 171, as previously described. Input HP symbol buffer 170 includes tag bit memory locations for the 15 HP samples therein, and all are set to an untagged state upon initial loading. At step 156, the minimum powered HP sample is found and tagged, as described in the sub-process flow chart of FIG. 13 with respect to the operation of LP/HP sample distributor 35' in FIG. 11. On the first loop of this process, with all HP samples untagged, the minimum powered untagged HP sample will be HP sample number 8 as seen in HP OFDM symbol 66 of FIG. 26. Next, at step 157, the Diff sample in input Diff symbol buffer 171 corresponding to the just tagged HP sample is read into the next available slot of output LP symbol buffer 173, starting from the first slot in the order of output from this buffer. In the example, the Diff sample corresponding to HP sample number 8 (the lowest powered HP sample) is labeled Diff sample number 1 in FIG. 26, wherein an arrow points from HP sample number 8 in HP OFDM symbol 66 directly upward to Diff sample number 1 in Diff symbol 65. This is the inverse of the operation of LP/HP sample distributor 35' in FIG. 11, wherein the first LP sample, in original LP sample order, was associated with the lowest power HP sample. Here, that LP sample number 1 is identified in the Diff symbol by its association with the lowest powered HP sample number 8 and is put in the first position of output LP symbol buffer 173.

Figure 26:
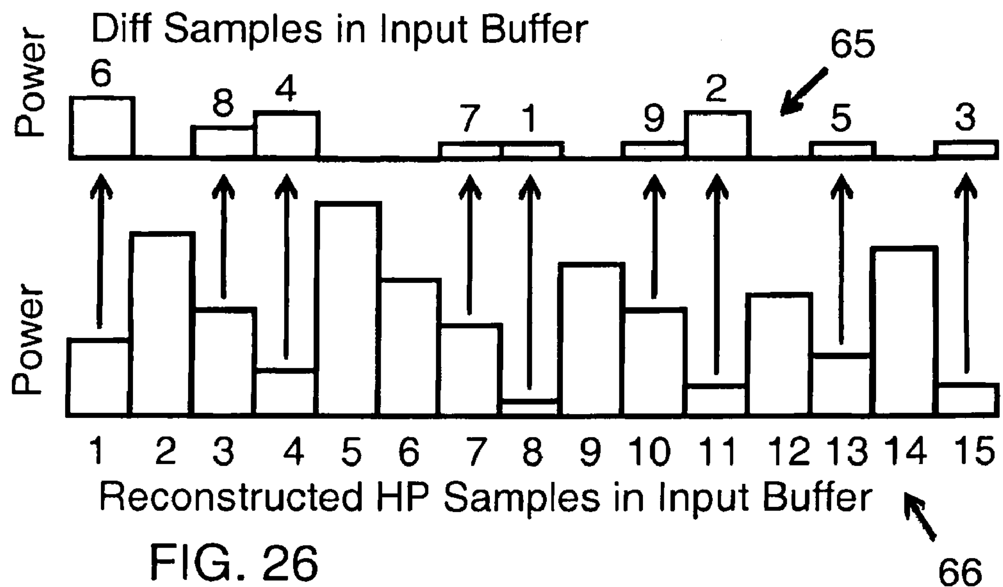
FIGS. 26 and 27 are graphical representations of sample power useful in explaining the operation of the LP OFDM restorer of FIG. 24 according to the flow chart of FIG. 25.
Figure 27:
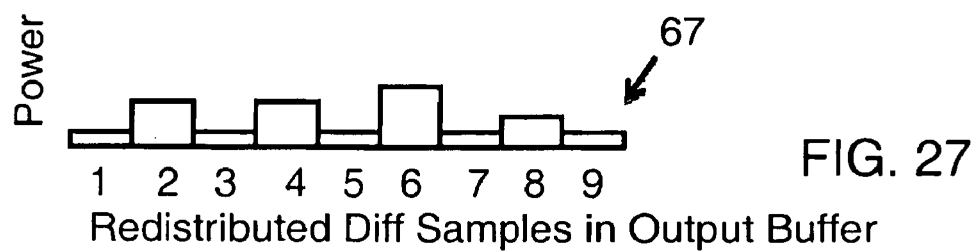

Next, at step 158, it is determined whether all slots of output LP symbol buffer 173 are filled (that is, non-zero). There are nine such slots in the embodiment of this example, since there are nine LP OFDM samples in each LP OFDM symbol. If the slots are not all filled, the process loops back to step 156, wherein the next minimum powered untagged HP sample is found and tagged. Referring to FIG. 26, this will be HP sample number 11 (in the case of HP samples indistinguishable by sample power, such as samples 11 and 15 in HP OFDM symbol 66, the first in original HP sample order is considered the lowest in power for purposes of the rule of sample association); and the corresponding Diff sample, given number 2, will be placed in the number 2 slot of output LP symbol buffer 173. The process will repeatedly loop until all nine slots of output LP symbol buffer 173 are filled with Diff samples in this manner, as seen in recovered LP OFDM sample 67 of FIG. 27, which can be compared with LP OFDM symbol 41 of FIGS. 9 and 14. When the last slot is filled, the process will proceed to step 159, wherein the Diff samples are read out as recovered LP samples in their original LP sample order. Alternatively, step 157 could produce the same result by determining if enough HP samples had been tagged to provide the nine Diff samples required for a recovered LP OFDM symbol. It is noted that, as previously stated, no Diff sample is examined to determine if its sample power is too low to be an LP OFDM sample; the process relies on the same rules used by LP/HP sample distributor 35' in transmitter 11 based on comparative HP sample power and order of association.

A slight modification of the operation of LP OFDM restorer 35' permits recovery of the LP samples from hierarchically modulated symbols in which the LP OFDM symbols are modulated on the HP OFDM symbols in original LP sample order, as described in the process "LP/HP Sample Distribution 3" of FIGS. 17A and 17B. The LP symbol recovery process "LP Symbol Recovery 3" is a flow chart, shown in FIGS. 28A and 28B, that describes this operation of LP OFDM restorer 86'; and the result is demonstrated in the graphical presentation of FIG. 29.

Figure 28A:
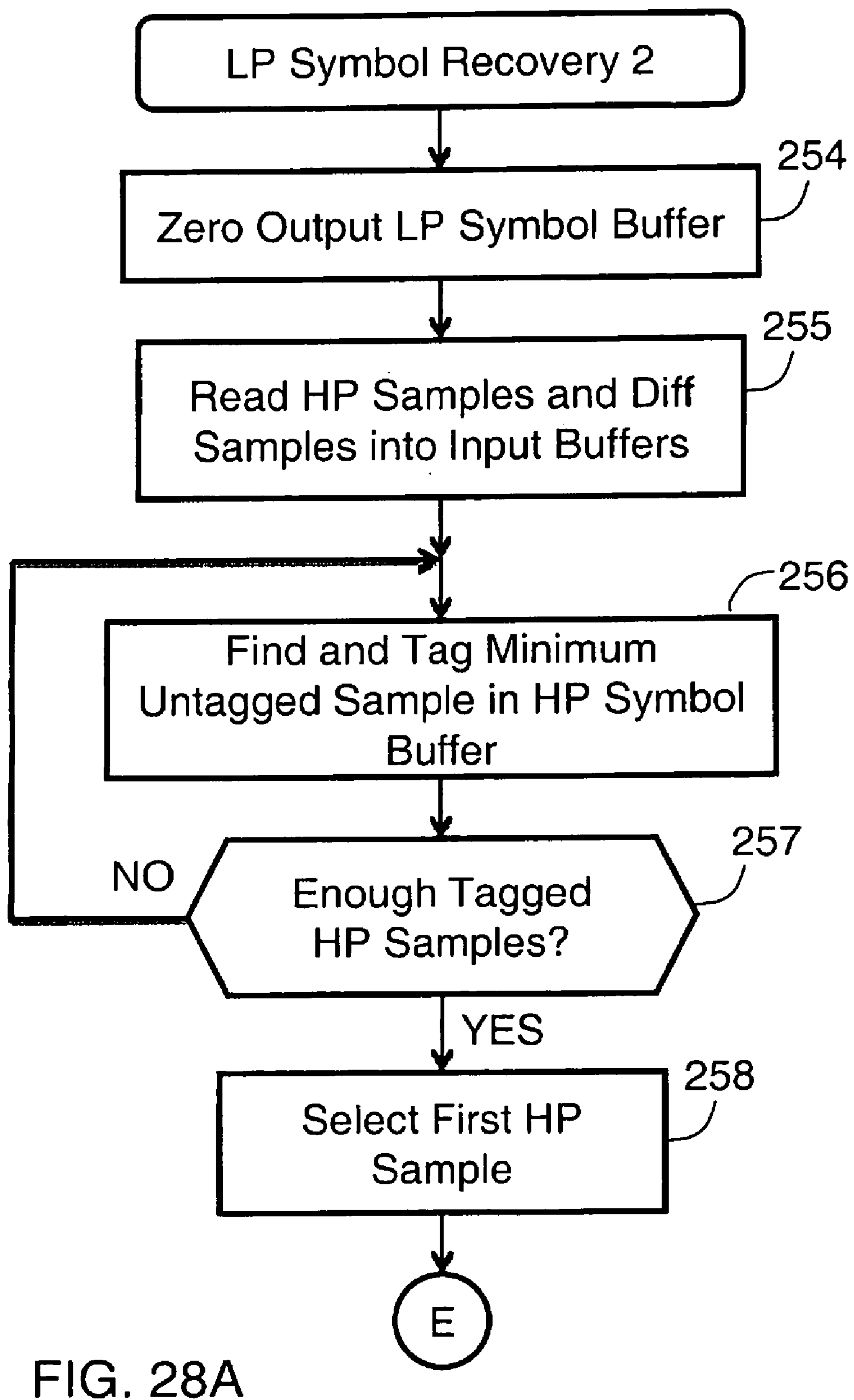
FIGS. 28A and 28B show a flow chart illustrating an alternative operation of the LP OFDM restorer of FIG. 24.
Figure 28B:
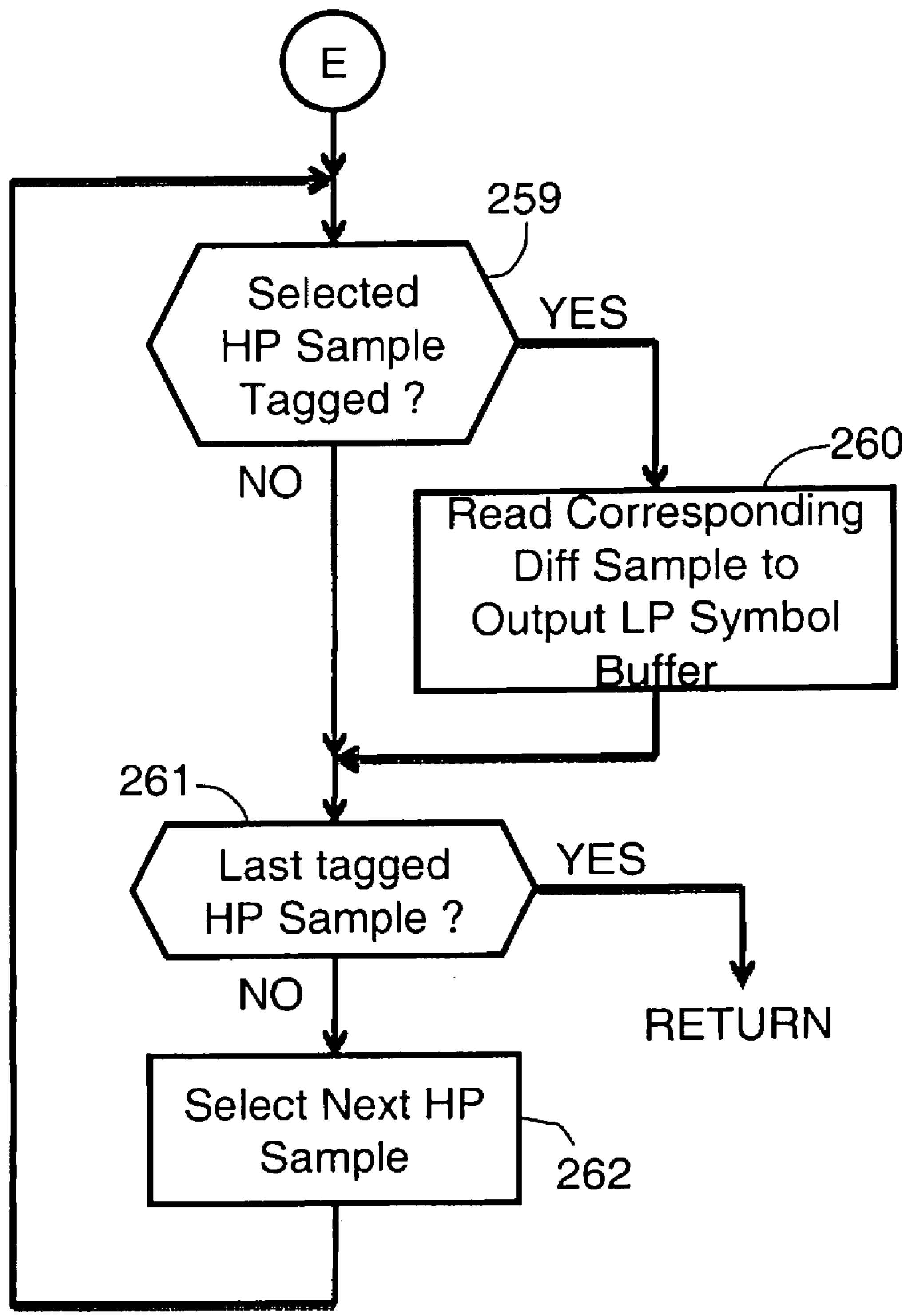

The process begins in FIG. 28A at step 254 with all sample slots in output LP symbol buffer 173 being zeroed. At step 255 the reconstructed HP samples are read into input HP symbol buffer 170 with tag bits set untagged; and the Diff samples are read into input Diff symbol buffer 171. At step 256, the minimum powered HP sample in input HP symbol buffer 170 is found and tagged, as described in the sub-process flow chart of FIG. 13 "Find and Tag Minimum Untagged HP Sample." At step 257 it is determined if enough HP samples have been tagged to duplicate the HP tagging in the transmitter, where the lowest power HP samples were tagged for modulation by the LP samples. In this example the number of tagged HP samples is nine. If the answer is no, the process loops back to step 256 to find and tag the next least powered HP sample; and this looping continues until the answer is yes. In this example, nine have been tagged; and, referring to HP OFDM symbol 66 of FIG. 30, the samples that are tagged are the smallest of the nine, as determined by the same rule as is used in the transmitter. These samples are marked by the upward pointing arrows. For the rest of this description it does not matter in what order they were tagged; it only matters that the tagged HP samples are the nine least powered HP samples of the HP OFDM symbol and are in original HP sample order.

Figure 29:
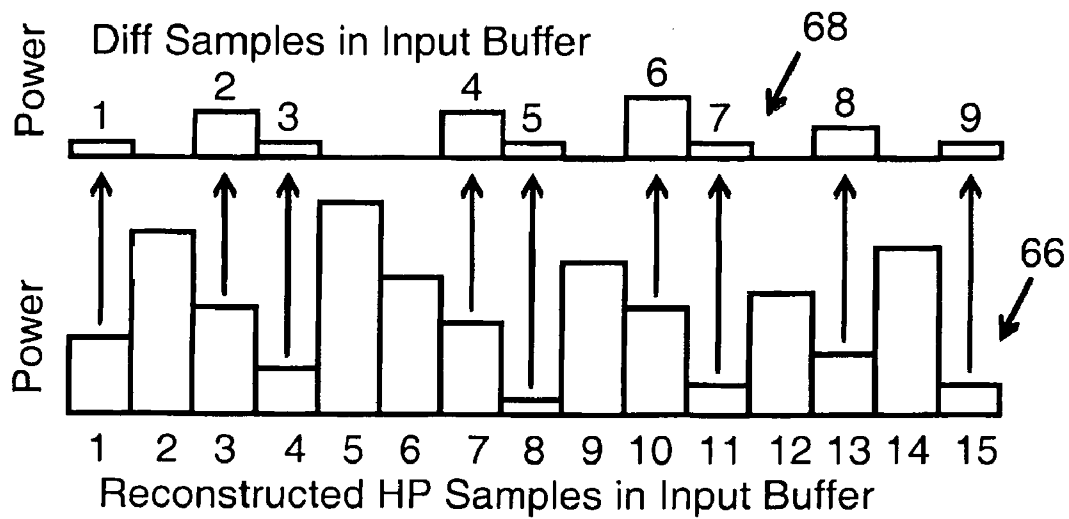
FIG. 29 is a graphical representation of sample power useful in explaining the operation of the LP OFDM restorer of FIG. 24 according to the flow chart of FIGS. 28A and 28B.

With the required number of lowest powered HP samples tagged in input HP symbol buffer 170, the process has identified the nine HP samples, seen as HP OFDM symbol 66 in FIG. 29, whose corresponding Diff samples in the input Diff symbol buffer 68 will comprise the recovered LP OFDM symbol. These corresponding Diff samples, considered as LP samples, are in the original LP sample order, but they are nine samples distributed over fifteen sample slots, with the extra six slots not holding an LP sample. Thus, the process proceeds to identify and eliminate the extra six unwanted slots so that the nine Diff samples corresponding to tagged HP samples are read into output LP symbol buffer 173 as nine LP samples in original LP sample order. At step 258 it selects the first HP sample in input HP symbol buffer 170 (number 1). Referring to FIG. 29B, the process then determines at step 159 if the selected HP sample is tagged. If it is, the corresponding Diff sample is read into the first slot of output LP symbol buffer 173 at step 260. If the selected HP sample is not tagged, however, step 160 is skipped. In either case, the process next determines at step 261 if this is the last HP sample in input HP symbol buffer 170 (all fifteen HP samples will eventually be examined for a tag). If the selected HP sample is not the last in the buffer, the process selects the next HP sample (number 2 in this example) for another loop of the process. As seen in FIG. 30, the second HP sample is not tagged; and the contents of the corresponding Diff sample slot will be ignored. The process will continue to loop until the last tagged HP sample has been detected (which will, in this example, produce the last Diff sample number 9). When this last sample is confirmed at step 261, the nine Diff samples in output LP symbol buffer 173 will comprise the recovered LP OFDM symbol 67, seen in FIG. 27, ready to be processed by LP OFDM demodulator 87 and LP decoder 88 of receiver 21.

As with the corresponding transmitter process "LP/HP Sample Distribution 3", the LP samples can be recovered in this receiver process regardless of the order of association of the LP samples with the lowest powered HP samples in the LP OFDM symbol. At step 260 as the process is described, the Diff sample corresponding to the next tagged HP sample is read into output LP symbol buffer 173 to be read out as a recovered LP sample in original LP sample order, because the LP samples were associated with the tagged HP samples in the transmitter process "LP/HP Sample Distribution 3" in original LP sample order: that is, in a sample sequence represented by the number sequence 123456789. But if the LP samples had been associated with the HP samples in a different order, such as the sequence 629478135 given as an example in the previous description of the corresponding transmitter process, this receiver process "LP Symbol Recovery 2" could easily use the same sequence at step 261 to place the Diff samples in original LP sample order in output LP symbol buffer 173.

It should be noted that the pseudo-sort processes used in some of the embodiments described herein are essentially batch processes requiring a large amount of processing time. If this presents a problem for signal flow, this problem may be alleviated by providing multiple, parallel processing paths for consecutive OFDM symbols at the appropriate places in the signal path.

The invention claimed is:

1. A method for transmitting high priority and low priority digital data in hierarchical modulation from an earth-orbiting satellite, the method comprising the steps:

encoding the high priority digital data with a forward error correcting code to provide encoded high priority digital data;

performing an Inverse Fast Fourier Transform on the encoded high priority digital data to provide high priority, orthogonal frequency division multiplexed (OFDM) symbols each comprising a first predetermined number of samples in an original high priority sample order, each of the first predetermined number of samples having a sample power;

encoding the low priority digital data with a forward error correcting code to provide encoded low priority digital data;

performing an Inverse Fast Fourier Transform on the encoded low priority digital data to provide low priority orthogonal frequency division multiplexed (OFDM) symbols each comprising a second predetermined number of samples in an original low priority sample order, wherein the second predetermined number is less than the first predetermined number;

selecting one of the high priority OFDM symbols and one of the low priority OFDM symbols;

selecting a plurality of samples of the selected high priority OFDM symbol equal in number to the second predetermined number, wherein the selecting is in accordance with a first consistent, deterministic rule using sample power comparisons to eliminate one or more of the highest powered samples of the high priority OFDM symbol from selection;

associating each sample of the selected low priority OFDM symbol with a different one of the selected samples of the selected high priority OFDM symbol according to a second consistent, deterministic rule relating the original low priority sample order to the original high priority sample order;

deriving a combined OFDM symbol based on the selected high priority OFDM symbol by (1) leaving unchanged each sample of the selected high priority OFDM symbol having no associated sample of the low priority OFDM symbol and (2) superimposing each sample of the selected low priority OFDM symbol onto its associated sample of the selected high priority OFDM symbol to provide a combined sample having a sample power equal to the sum of the sample powers of the associated samples so combined;

incorporating the combined OFDM symbol in a radio frequency OFDM signal, whereby the encoded low priority digital data is modulated as secondary data on the encoded high priority digital data, as primary data, in hierarchical modulation; and transmitting the radio frequency OFDM signal on a plurality of orthogonal radio frequency carriers.

2. The method of claim 1 wherein, in deriving each combined OFDM symbol, each of the selected samples of the selected high priority OFDM symbol has a sample power no larger than any of the samples of the selected high priority OFDM symbol that are not selected.

3. The method of claim 1 wherein the first consistent, deterministic rule comprises identifying a plurality of samples of the high priority OFDM symbol, equal in number to the number of samples of the low priority OFDM symbol, that are lowest in sample power.

4. The method of claim 3 wherein the second consistent, deterministic rule comprises associating each sample of the low priority OFDM symbol, in the original low priority sample order, with one of the selected samples of the high priority OFDM symbol, in order of increasing sample power.

5. The method of claim 3 wherein the second consistent, deterministic rule comprises associating each sample of the low priority OFDM symbol, in the original low priority sample order, with one of the selected samples of the high priority OFDM symbol, in the original high priority sample order.

6. The method of claim 1 wherein the first and second consistent, deterministic rules together comprise comparing samples of the selected high priority OFDM symbol, in the original high priority sample order, with a predetermined reference power limit and associating therewith a sample of the low priority OFDM symbol, in the original low priority sample order, only if the compared sample of the high priority OFDM symbol is no greater than the predetermined reference power limit.

7. A method of receiving a hierarchically modulated orthogonal frequency division multiplexed (OFDM) radio frequency transmission comprising a series of combined OFDM symbols comprising encoded low priority digital data hierarchically modulated onto encoded high priority digital data, wherein each combined OFDM symbol comprises a first predetermined number of samples each corresponding, in an original combined sample order, to a selected sample of a high priority OFDM symbol having the first predetermined number of samples and containing the high priority encoded digital data, wherein each of a second predetermined number, less than the first predetermined number, of the samples of the combined OFDM symbol is a combined sample having a sample power equal to a sum of (1) the sample power of the corresponding sample of the high priority OFDM symbol and (2) the sample power of an associated sample of a low priority OFDM symbol having the second predetermined number of samples and containing the encoded low priority digital data, wherein the correspondence of the selected samples of the high priority OFDM symbol is characterized by a first consistent, deterministic rule using sample power comparisons to eliminate one or more of the highest powered samples of the high priority OFDM symbol from selection, and wherein the association of each of the selected samples of the low priority OFDM symbol with a particular one of the selected samples of the high priority OFDM symbol is characterized by a second consistent, deterministic rule relating an original low priority sample order to an original high priority sample order in the combined OFDM symbol, the method comprising the steps:

deriving combined OFDM symbols from the received, hierarchically modulated OFDM transmission; copying the combined OFDM symbols and storing the copies; demodulating the combined OFDM symbols to recover the encoded high priority digital data; decoding the encoded high priority digital data to recover the transmitted high priority digital data; copying and re-encoding the high priority digital data; performing an Inverse Fast Fourier Transform on the encoded high priority digital data to provide reconstructed high priority OFDM symbols corresponding to the combined OFDM symbols; selecting one of the reconstructed high priority OFDM symbols and the stored copy of its corresponding combined OFDM symbol; subtracting each sample of the selected high priority OFDM symbol from a corresponding sample of the selected stored copy of its corresponding combined symbol to provide a Diff sample, the provided Diff samples comprising a Diff symbol; according to the first consistent, deterministic rule, determining which samples of the reconstructed high priority OFDM symbol are associated with a sample of a low priority OFDM symbol; selecting the Diff samples corresponding to the samples of the reconstructed high priority OFDM symbol that are determined to be selected for an associated sample of a low priority OFDM symbol and distributing the selected Diff samples into the original low priority sample order according to the second consistent deterministic rule to provide a recovered low priority OFDM symbol; and demodulating and decoding the low priority OFDM symbol to recover the transmitted low priority digital data.

8. The method of claim 7 wherein, in each combined OFDM symbol, each of the selected samples of the selected high priority OFDM symbol has a sample power no larger than any of the samples of the selected high priority OFDM symbol that are not selected.

9. The method of claim 7 wherein the first consistent, deterministic rule comprises identifying a plurality of samples of the high priority OFDM symbol, equal in number to the number of samples of the low priority OFDM symbol, that are lowest in sample power.

10. The method of claim 9 wherein the second consistent, deterministic rule comprises associating each sample of the low priority OFDM symbol, in the original low priority sample order, with one of the selected samples of the high priority OFDM symbol, in order of increasing sample power.

11. The method of claim 9 wherein the second consistent, deterministic rule comprises associating each sample of the low priority OFDM symbol, in the original low priority sample order, with one of the selected samples of the high priority OFDM symbol, in the original high priority sample order.

12. The method of claim 7 wherein the first and second consistent, deterministic rules together comprise comparing samples of the selected high priority OFDM symbol, in the original high priority sample order, with a predetermined reference power limit and associating therewith a sample of the low priority OFDM symbol, in the low priority sample order, only if the compared sample of the original high priority OFDM symbol is no greater than the predetermined reference power limit.

* * * * *